US006989625B2

(12) United States Patent
Suzuki et al.

(10) Patent No.: US 6,989,625 B2
(45) Date of Patent: *Jan. 24, 2006

(54) ACOUSTIC MATCHING LAYER, ULTRASONIC TRANSDUCER AND ULTRASONIC FLOWMETER

(75) Inventors: Masaaki Suzuki, Osaka (JP); Takashi Hashida, Osaka (JP); Kazuhiko Hashimoto, Moriguchi (JP); Masahiko Hashimoto, Shijonawate (JP); Hidetomo Nagahara, Kyoto (JP); Seigo Shiraishi, Neyagawa (JP); Norihisa Takahara, Ibaraki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 11 days.

This patent is subject to a terminal disclaimer.

(21) Appl. No.: 10/475,373

(22) PCT Filed: Jan. 28, 2003

(86) PCT No.: PCT/JP03/00813

§ 371 (c)(1),
(2), (4) Date: Oct. 20, 2003

(87) PCT Pub. No.: WO03/064981

PCT Pub. Date: Aug. 7, 2003

(65) Prior Publication Data

US 2004/0124746 A1  Jul. 1, 2004

(30) Foreign Application Priority Data

Jan. 28, 2002  (JP) ............................. 2002-018047
Feb. 5, 2002   (JP) ............................. 2002-027834

(51) Int. Cl.
*H01L 41/08* (2006.01)

(52) U.S. Cl. .................................................... 310/334
(58) Field of Classification Search ................ 310/326, 310/334–337
See application file for complete search history.

(56) References Cited

U.S. PATENT DOCUMENTS

| 4,211,948 A | * | 7/1980 | Smith et al. ................. 310/322 |
| 4,366,406 A | * | 12/1982 | Smith et al. ................. 310/334 |
| 4,523,122 A | * | 6/1985 | Tone et al. .................. 310/334 |
| 4,756,808 A | * | 7/1988 | Utsumi et al. ............... 204/486 |
| 5,093,810 A | | 3/1992 | Gill |
| 5,343,109 A | * | 8/1994 | Mockl ......................... 310/334 |
| 6,057,632 A | * | 5/2000 | Ustuner ....................... 310/334 |
| 6,307,302 B1 | * | 10/2001 | Toda .......................... 310/334 |

(Continued)

FOREIGN PATENT DOCUMENTS

| JP | 57-097300 A | 6/1982 |
| JP | 63-061161 A | 3/1988 |
| JP | 10-253604 A | 9/1998 |
| JP | 2002-259267 A | 9/2002 |

*Primary Examiner*—Mark Budd
(74) *Attorney, Agent, or Firm*—Akin Gump Strauss Hauer & Feld, LLP

(57) ABSTRACT

An acoustic matching layer 1 according to the present invention includes a first acoustic matching layer 2, which has a low density and a low sonic velocity, and a second acoustic matching layer 3, which has a higher density and a higher sonic velocity. The first acoustic matching layer 2, of which the acoustic impedance is matched to that of a medium into an ultrasonic wave is radiated, is provided closer to the medium, while the second acoustic matching layer 3 is provided closer to a piezoelectric layer, thereby increasing the sensitivity of an ultrasonic transducer.

19 Claims, 9 Drawing Sheets

U.S. PATENT DOCUMENTS

| | | | |
|---|---|---|---|
| 6,551,247 B2 * | 4/2003 | Saito et al. | 600/459 |
| 6,628,047 B1 * | 9/2003 | Rhyne | 310/336 |
| 6,691,387 B2 * | 2/2004 | Hanafy | 29/25.35 |
| 6,776,051 B2 * | 8/2004 | Suzuki et al. | 73/861.27 |
| 6,788,620 B2 * | 9/2004 | Shiraishi et al. | 367/152 |
| 6,822,376 B2 * | 11/2004 | Baumgartner | 310/365 |

* cited by examiner (a)

(b)

(c)

(d)

(e)

ACOUSTIC MATCHING LAYER, ULTRASONIC TRANSDUCER AND ULTRASONIC FLOWMETER

CROSS-REFERENCE TO RELATED APPLICATION

This application is a Section 371 of International Application No. PCT/JP03/00813, filed Jan. 28, 2003.

1. Technical Field

The present invention relates to an acoustic matching layer for use in an ultrasonic sensor, an ultrasonic transducer to transmit or receive an ultrasonic wave, a method for fabricating such an ultrasonic transducer, and an ultrasonic flowmeter using such an ultrasonic transducer.

2. Background Art

In recent years, an ultrasonic flowmeter has been used as a gas meter, for example. The ultrasonic flowmeter measures the time that it takes for an ultrasonic wave to go through a propagation path and calculates the flow velocity of a fluid, thereby obtaining its flow rate.

FIG. 12 shows a measuring principle of such an ultrasonic flowmeter. As shown in FIG. 12, a fluid is flowing through a tube at a velocity V in the indicated direction. A pair of ultrasonic transducers 101 and 102 is provided on the tube wall 103 so as to face each other. Each of the ultrasonic transducers 101 and 102 includes a piezoelectric body, made of a piezoceramic, for example, as an electromechanical energy converter, and exhibits a resonance characteristic just like a piezoelectric buzzer or a piezoelectric oscillator. In this example, the ultrasonic transducer 101 is used as an ultrasonic transmitter and the ultrasonic transducer 102 is used as an ultrasonic receiver.

The ultrasonic flowmeter operates in the following manner. When an alternating current voltage, having a frequency in the vicinity of the resonant frequency of the ultrasonic transducer 101, is applied to the piezoelectric vibrator thereof, the ultrasonic transducer 101 functions as an ultrasonic transmitter to radiate an ultrasonic wave into the external fluid such that the ultrasonic wave goes along the propagation path L1 shown in FIG. 12. Then, the ultrasonic transducer 102 receives the ultrasonic wave propagated and transforms it into a voltage. Thereafter, the ultrasonic transducer 102 is used as an ultrasonic transmitter and the ultrasonic transducer 101 is used as an ultrasonic receiver in turn. Specifically, when an alternating current voltage, having a frequency in the vicinity of the resonant frequency of the ultrasonic transducer 102, is applied to the piezoelectric vibrator thereof, the ultrasonic transducer 102 radiates an ultrasonic wave into the external fluid such that the ultrasonic wave goes along the propagation path L2 shown in FIG. 12. Then, the ultrasonic transducer 101 receives the ultrasonic wave propagated and transforms it into a voltage. In this manner, each of the ultrasonic transducers 101 and 102 alternately functions as a receiver and as a transmitter. Thus, these transducers 101 and 102 are sometimes called "ultrasonic transceivers".

Also, in such an ultrasonic flowmeter, if the alternating current voltage is applied to one of the ultrasonic transducers continuously, then the ultrasonic transducer radiates an ultrasonic wave continuously, thereby making it difficult to measure the propagation time. For that reason, a burst voltage signal, which uses a pulse signal as a carrier, is normally used as a drive voltage. Hereinafter, the measuring principle will be described in further detail.

If an ultrasonic burst signal is radiated from the ultrasonic transducer 101 by applying the burst voltage signal to the ultrasonic transducer 101 for driving purposes, then the ultrasonic burst signal will be propagated over a distance L along the propagation path L1 and reach the ultrasonic transducer 102 in a time t. The ultrasonic transducer 102 can transform only the ultrasonic burst signal propagated into an electric burst signal at a high SNR (signal-to-noise ratio). This electric burst signal is amplified electrically and then applied to the ultrasonic transducer 101 again, thereby making the ultrasonic transducer 101 radiate another ultrasonic burst signal. Such an apparatus is called a "sing-around apparatus". Also, a period of time it takes for an ultrasonic pulse, radiated from the ultrasonic transducer 101, to reach the ultrasonic transducer 102 by way of the propagation path is called a "sing-around period", the inverse number of which is called a "sing-around frequency".

In FIG. 12, the flow velocity of the fluid flowing through the tube is supposed to be V, the velocity of the ultrasonic wave in the fluid is supposed to be C, and the angle defined between the direction in which the fluid is flowing and the direction in which the ultrasonic pulse is propagated is supposed to be θ. If the ultrasonic transducers 101 and 102 are used as an ultrasonic transmitter and an ultrasonic receiver, respectively, then the following Equation (1) is satisfied:

$$f1=1/t1=(C+V\cos\theta)/L \qquad (1)$$

where t1 is the sing-around period (i.e., the time it takes for the ultrasonic pulse, radiated from the ultrasonic transducer 101, to reach the ultrasonic transducer 102) and f1 is the sing-around frequency.

Conversely, if the ultrasonic transducers 102 and 101 are used as an ultrasonic transmitter and an ultrasonic receiver, respectively, then the following Equation (2) is satisfied:

$$f2=1/t2=(C-V\cos\theta)/L \qquad (2)$$

where t2 is the sing-around period and f2 is the sing-around frequency in that situation.

The difference Δf between these two sing-around frequencies is given by the following Equation (3):

$$\Delta f = f1 - f2 = 2V\cos\theta/L \qquad (3)$$

According to Equation (3), the flow velocity V of the fluid can be obtained from the distance L of the ultrasonic wave propagation path and the frequency difference Δf. And the flow rate can be determined by the flow velocity V.

Such an ultrasonic flowmeter is required to exhibit high precision. To increase the precision, it is important to appropriately adjust the acoustic impedance of an acoustic matching layer. The acoustic matching layer is provided on the ultrasonic wave transmitting/receiving surface of a piezoelectric vibrator in an ultrasonic transducer that transmits an ultrasonic wave into a gas or receives an ultrasonic wave that has been propagated through a gas.

FIG. 10 is a cross-sectional view showing a configuration for a conventional ultrasonic transducer 10'. The ultrasonic transducer 10' includes a piezoelectric layer (vibrating means) 4, an acoustic impedance matching layer (or acoustic matching means, which will be referred to herein as an "acoustic matching layer") 1, and a case 5. The acoustic matching layer 1' and the piezoelectric layer 4 are each bonded to the case 5 by way of an adhesive layer of an epoxy adhesive, for example. The ultrasonic vibrations, generated in the piezoelectric layer 4 at a particular frequency (e.g., 500 kHz), are transmitted to the case by way of the adhesive layer (not shown) and then to the acoustic matching layer 1 by way of the second adhesive layer. After that, the matched vibrations are propagated as acoustic waves into a gas, which is a medium existing in the space.

It is the role of the acoustic matching layer 1' to propagate the vibrations of the piezoelectric layer 4 to the gas efficiently. The acoustic impedance Z of a substance is defined by the following Equation (4):

$$z = \rho \times C \quad (4)$$

where C is the sonic velocity in the substance and ρ is the density of the substance.

The acoustic impedance of a gas into which the ultrasonic wave is radiated is greatly different from that of the piezoelectric layer 4. For example, a piezoceramic such as lead zirconate titanate (PZT), which is a normal piezoelectric material for the piezoelectric layer 2, has an acoustic impedance Z1 of about $30 \times 10^6$ kg/s·m². On the other hand, the gas into which the ultrasonic wave is radiated (e.g., the air) has an acoustic impedance Z3 of about 400 kg/s·m². An acoustic wave being propagated is reflected from the boundary surface between two substances with mutually different acoustic impedances. Also, after having been transmitted through the boundary surface, the acoustic wave will have a decreased intensity. Thus, a method for reducing such sound reflection and increasing the intensity of the acoustic wave being transmitted by inserting a substance, of which the acoustic impedance is given by the following Equation (5), between the piezoelectric body with the acoustic impedance Z1 and the gas with the acoustic impedance Z3 is well known as a method for solving these problems:

$$Z2 = (Z1 \times Z3)^{(1/2)} \quad (5)$$

The best matched acoustic impedance, satisfying this condition, will be about $11 \times 10^4$ kg/s·m². The substance having such acoustic impedance must be a solid with a sufficiently low density and a low sonic velocity as can be seen from Equation (4). Normally, a material obtained by solidifying a glass balloon (i.e., a hollow tiny glass sphere) or a plastic balloon with a resin material is provided on the vibrating surface of the piezoelectric layer (which is also called an "ultrasonic vibrator"). A technique of thermally compressing a glass balloon and a technique of foaming a molten material are also used as disclosed in Japanese Patent No. 2559144, for example.

However, the acoustic impedance of each of these materials is greater than $50 \times 10^4$ kg/s·m². To achieve a higher degree of matching between the gas and the material and high sensitivity, a material with even smaller acoustic impedance is needed.

The applicant of the present application disclosed in Japanese Patent Application No. 2001-56501 (filed on Feb. 28, 2001) that if the acoustic matching layer is made of a dry gel, the acoustic impedance can be decreased as compared with the conventional epoxy resin with the glass balloon and that the durability can be increased by hydrophobizing the dry gel.

As described above, if the degree of matching between the acoustic matching layer and the gas (i.e., the medium into which the ultrasonic wave is radiated) is increased by decreasing the acoustic impedance of the acoustic matching layer, then the ultrasonic transducer can have very high sensitivity. However, if an ultrasonic wave is transmitted or received by using a pulse signal as a carrier (e.g., when the propagation time is measured with a flowmeter by means of an ultrasonic wave), then the signal rises less steeply, thus making it difficult to decide how much time it takes for the ultrasonic wave to reach. The reason is as follows. Normally, by detecting peaks of an ultrasonic wave received signal, which are equal to or higher than a predetermined detection level, it is determined whether or not the ultrasonic wave has reached. Accordingly, if the output signal rises sufficiently steeply, then the difference between the peaks of the ultrasonic wave will be big enough to sense the peaks that are used to determine whether or not the ultrasonic wave has reached. As a result, the decision can be made without errors. In contrast, if the ultrasonic wave received signal does not rise so steeply, then the difference between the peaks of the output signal representing the ultrasonic wave received will not be so big as to sense easily the peaks that are used to determine whether or not the ultrasonic wave has reached. As a result, detection errors occur frequently.

DISCLOSURE OF INVENTION

In order to overcome the problems described above, a main object of the present invention is to provide an acoustic matching layer for an ultrasonic transducer, which has an acoustic impedance that is low enough to achieve a high degree of matching with a gas as an ultrasonic wave propagating medium and to transmit and receive the ultrasonic wave at a high sensitivity and which can increase the steepness of the signal rising response. Other objects of the present invention are to provide an ultrasonic transducer including such an acoustic matching layer and a flowmeter including such an ultrasonic transducer.

An acoustic matching layer according to the present invention matches the acoustic impedance of a piezoelectric layer to that of a gas. The acoustic matching layer includes: a first acoustic matching layer having a density of 50 kg/m³ to 500 kg/m³; and a second acoustic matching layer having a density of 400 kg/m³ to 1,500 kg/m³. The density of the first acoustic matching layer is lower than that of the second acoustic matching layer.

In one embodiment, the density of the first acoustic matching layer falls within the range of 50 kg/m³ to 400 kg/m³ and the density of the second acoustic matching layer falls within the range of greater than 400 kg/m³ to 800 kg/m³.

In another embodiment, the acoustic impedance Za of the first acoustic matching layer and the acoustic impedance Zb of the second acoustic matching layer satisfy Za<Zb.

In another embodiment, the thickness of the first acoustic matching layer is approximately equal to a quarter of the wavelength λ of an acoustic wave being propagated through the first acoustic matching layer.

In another embodiment, the acoustic impedance of the first acoustic matching layer falls within the range of $5 \times 10^4$ kg/s·m² to $20 \times 10^4$ kg/s·m².

In another embodiment, the thickness of the second acoustic matching layer is approximately equal to a quarter of the wavelength λ of an acoustic wave being propagated through the second acoustic matching layer.

In another embodiment, the first and second acoustic matching layers both include an inorganic oxide.

In another embodiment, the first acoustic matching layer includes a dry gel.

In a specific embodiment, the first acoustic matching layer includes a powder of the dry gel.

In another embodiment, a skeleton of the dry gel includes an inorganic oxide.

In a specific embodiment, the inorganic oxide is silicon dioxide.

In another specific embodiment, the inorganic oxide skeleton is hydrophobized.

In another embodiment, the first and second acoustic matching layers are directly bonded together.

In another embodiment, the acoustic matching layer further includes a structure supporting layer between the first and second acoustic matching layers. The structure supporting layer has a density of at least 1,000 kg/m³ and a thickness that is less than one eighth of the wavelength λ of an acoustic wave being propagated through the structure supporting layer.

An ultrasonic transducer according to the present invention includes: a piezoelectric layer; and the acoustic matching layer according to any of the preferred embodiments of the present invention described above. The acoustic matching layer is provided on the piezoelectric layer. The second acoustic matching layer is provided closer to the piezoelectric layer.

In one embodiment, the acoustic matching layer is directly bonded onto the piezoelectric layer.

In another embodiment, the ultrasonic transducer further includes a case. The case includes: a top plate that defines a concave portion to embed the piezoelectric layer therein; and a bottom plate that is arranged so as to close up an inner space of the concave portion hermetically. The piezoelectric layer is adhered onto an inside surface of the top plate of the case. The acoustic matching layer is bonded onto the upper surface of the top plate so as to face the piezoelectric layer by way of the top plate.

In one embodiment, the case is made of a metal material.

In another embodiment, the top plate of the case forms an integral part of the second acoustic matching layer.

An ultrasonic transducer fabricating method according to the present invention is a method for fabricating the ultrasonic transducer according to any of the preferred embodiments of the present invention described above. The method includes the steps of: forming the second acoustic matching layer either on the piezoelectric layer or on the top plate after the piezoelectric layer has been bonded on an inside surface thereof; and forming the first acoustic matching layer of the dry gel on the second acoustic matching layer. Alternatively, the method may include the steps of: forming the first acoustic matching layer of the dry gel on the second acoustic matching layer, thereby obtaining the acoustic matching layer; and bonding the acoustic matching layer onto either the piezoelectric layer or the top plate after the piezoelectric layer has been bonded onto an inside surface thereof.

An ultrasonic flowmeter according to the present invention includes: a flow rate measuring portion, through which a fluid under measurement flows; a pair of ultrasonic transducers, which is provided for the flow rate measuring portion and which transmits and receives an ultrasonic signal; a time measurement circuit for measuring time that it takes to propagate an ultrasonic wave between the pair of ultrasonic transducers; and a flow rate calculating circuit for calculating the flow rate of the fluid based on a signal supplied from the time measurement circuit. Each of the ultrasonic transducers is the ultrasonic transducer according to any of the preferred embodiments of the present invention described above.

BRIEF DESCRIPTION OF DRAWINGS

FIGS. 8($a$) through 8($c$) are graphs showing the reception output characteristics of ultrasonic transducers that were used in the present invention, wherein:

FIG. 8($a$) shows the characteristic of an ultrasonic transducer including a single acoustic matching layer (of glass epoxy);

FIG. 8($b$) shows the characteristic of an ultrasonic transducer including a single acoustic matching layer (of a silica dry gel); and FIG. 8($c$) shows the characteristic of an ultrasonic transducer including two acoustic matching layers (of a silica dry gel and a silica porous body, respectively).

FIGS. 9($a$) through 9($c$) are graphs showing the vibration displacement frequency characteristics of ultrasonic transducers that were used in the present invention, wherein:

FIG. 9($a$) shows the characteristic of an ultrasonic transducer including a single acoustic matching layer (of glass balloon with epoxy);

FIG. 9($b$) shows the characteristic of an ultrasonic transducer including a single acoustic matching layer (of a silica dry gel); and FIG. 9($c$) shows the characteristic of an ultrasonic transducer including two acoustic matching layers (of a silica dry gel and a silica porous body, respectively).

BEST MODE FOR CARRYING OUT THE INVENTION

Hereinafter, preferred embodiments of the present invention will be described with reference to the accompanying drawings.

Figure 1:
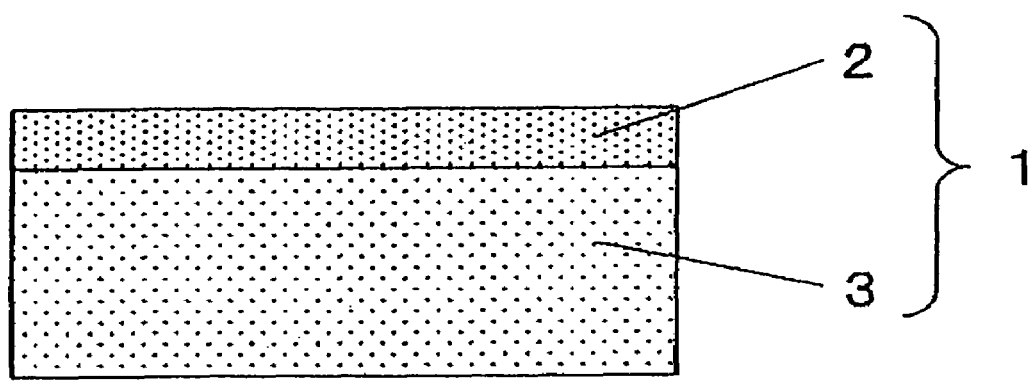
FIG. 1 is a cross-sectional view schematically showing an acoustic matching layer according to an embodiment of the present invention.

As shown in FIG. 1, an acoustic matching layer 1 according to an embodiment of the present invention includes a first acoustic matching layer 2 with a low density and a low sonic velocity and a second acoustic matching layer 3 with a higher density and a higher sonic velocity. The first acoustic matching layer 2 has a density of 50 kg/m³ to 500 kg/m³, while the second acoustic matching layer 3 has a density of 400 kg/m³ to 1,500 kg/m³. The density of the first acoustic matching layer 2 is lower than that of the second acoustic matching layer 3. For example, the density of the first acoustic matching layer 2 may be 50 kg/m³ to 400 kg/m³ and the density of the second acoustic matching layer 3 may be greater than 400 kg/m³ to 800 kg/m³.

Figure 2:
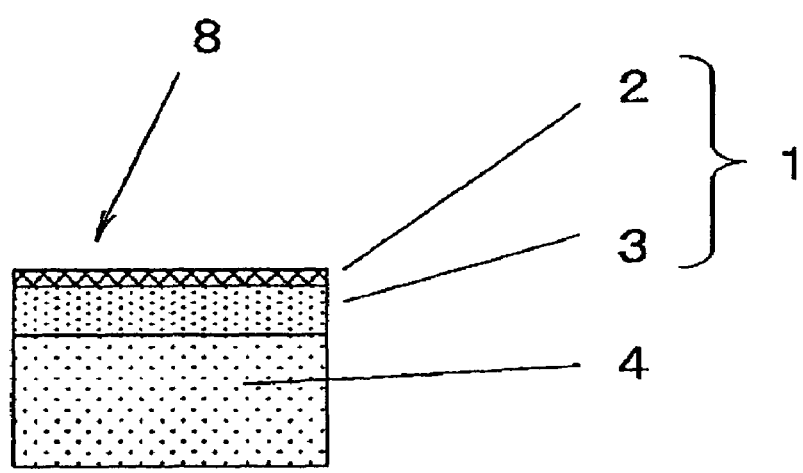
FIG. 2 is a cross-sectional view schematically showing a piezoelectric vibrator according to an embodiment of the present invention.

In a piezoelectric vibrator 8 according to an embodiment of the present invention, the first acoustic matching layer 2 is provided closer to a propagating medium and the second acoustic matching layer 3 is provided closer to a piezoelectric layer 4 as shown in FIG. 2. By using such a piezoelectric vibrator 8 including the acoustic matching layer 1 of the present invention, the ultrasonic transducer can exhibit high sensitivity.

Figure 3:
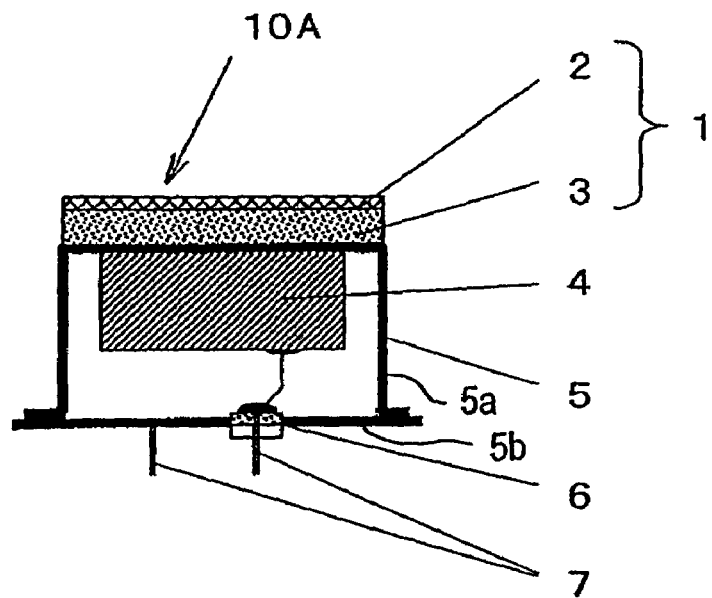
FIG. 3 is a cross-sectional view showing an ultrasonic transducer as a third embodiment of the present invention.
Figure 10:
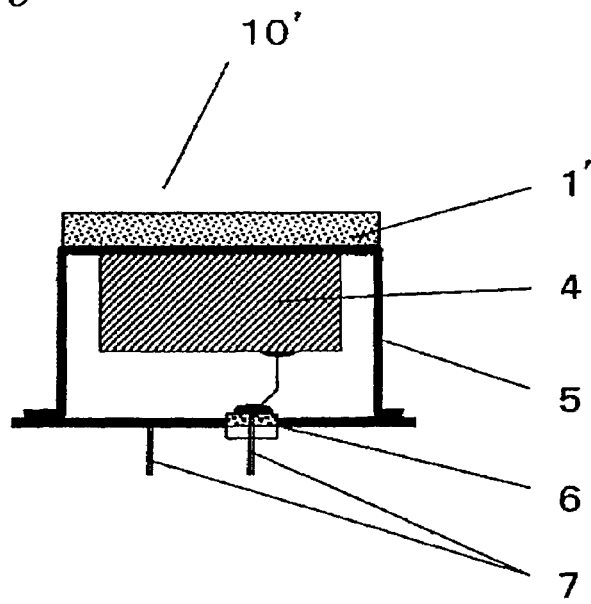
FIG. 10 is a cross-sectional view showing the structure of a conventional ultrasonic transducer.

For example, an ultrasonic transducer 10A according to an embodiment of the present invention shown in FIG. 3 includes the acoustic matching layer 1 of the embodiment of the present invention shown in FIG. 1 instead of the acoustic matching layer 1' of the conventional ultrasonic transducer 10' shown in FIG. 10. The first acoustic matching layer 2, of which the acoustic impedance is matched to that of the ultrasonic wave propagating medium, is provided closer to the medium. By adopting this arrangement, the ultrasonic transducer can have an acoustic impedance that is low enough to achieve a high degree of matching with a gas as the ultrasonic wave propagating medium. The ultrasonic transducer can also transmit and receive the ultrasonic wave at a high sensitivity and can increase the steepness of the signal rising response.

Hereinafter, the effects to be achieved by the arrangement of an ultrasonic transducer according to an embodiment of the present invention will be described in detail with reference to FIGS. 8(a) through 8(c) and FIGS. 9(a) through 9(c).

Figure 8A:
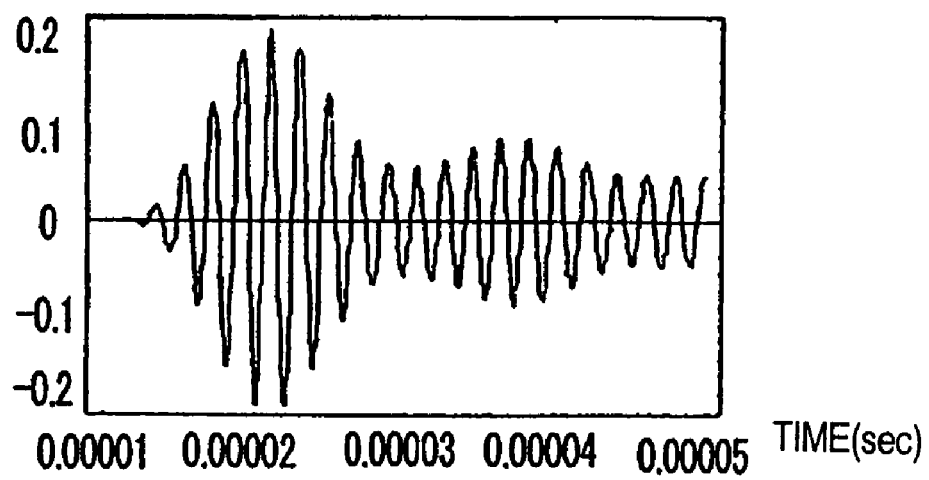
Figure 8B:
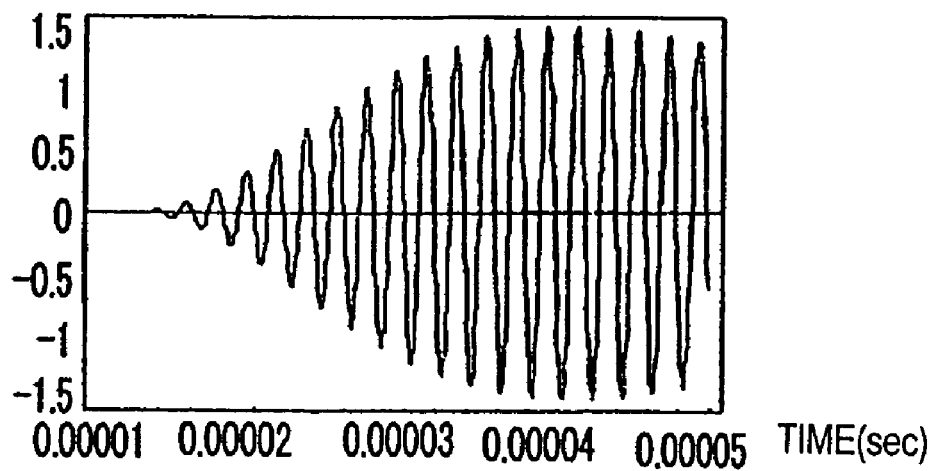
Figure 8C:
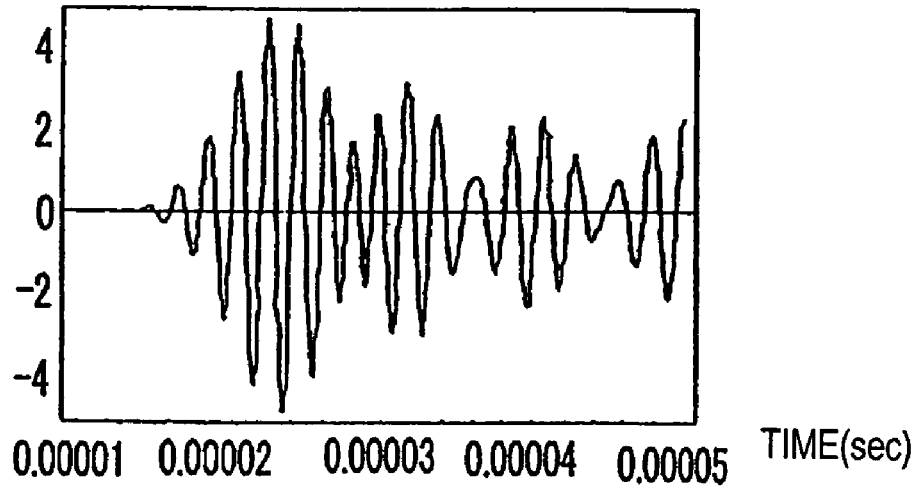

FIGS. 8(a) through 8(c) show the ultrasonic wave reception output characteristics of ultrasonic transducers (i.e., the reception waveforms of respective acoustic matching layers).

In FIGS. 8(a) and 8(b), the ultrasonic transducer 10' with the conventional structure, including a single acoustic matching layer as shown in FIG. 10, was used. Specifically, FIG. 8(a) shows the result obtained in a situation where a glass balloon/epoxy acoustic matching layer (with a thickness of 1.25 mm, a sonic velocity of 2,500 m/s and a density of 500 kg/m$^3$) was used. FIG. 8(b) shows the result obtained in a situation where an acoustic matching layer of a silica dry gel (with a thickness of 90 μm, a sonic velocity of 180 m/s and a density of 200 kg/m$^3$) was used.

FIG. 8(c) shows the characteristic of the ultrasonic transducer 10A according to the embodiment of the present invention shown in FIG. 3. Specifically, in this case, an acoustic matching layer of a silica dry gel (with a thickness of 90 μm, a sonic velocity of 180 m/s and a density of 200 kg/m$^3$) was used as the first acoustic matching layer 2, and an acoustic matching layer of a silica porous body (with a thickness of 750 μm, a sonic velocity of 1,500 m/s and a density of 570 kg/m$^3$) was used as the second acoustic matching layer 3.

First, comparing the result shown in FIG. 8(a) with that shown in FIG. 8(b), it can be seen that when the low-density dry gel was used as a material for the acoustic matching layer, the reception output voltage increased its maximum amplitude (i.e., a peak-to-peak voltage) and the sensitivity improved as compared with the situation where the conventional glass balloon and epoxy was used as is normally done in the art.

However, it can also be seen that the received signal rises less steeply in FIG. 8(b) than in FIG. 8(a). In addition, the difference in the output value of the 500 kHz ultrasonic signal between a peak of a rising wave portion thereof and the previous or following peak is so small that the propagation time to be sensed by the arrival detection level has too narrow a permissible width to avoid sensing errors or sense it easily. Accordingly, the ultrasonic transducer, of which the acoustic matching layer is made of a silica dry gel, can certainly exhibit high sensitivity but needs to have its rising response improved.

However, by using the acoustic matching layer consisting of two layers that are made of a silica dry gel and a silica porous body (obtained by baking silicon dioxide), respectively, the peak-to-peak voltage increases, the sensitivity improves, and the rising response is also good as shown in FIG. 8(c). The reason is believed to be as follows. Specifically, the first acoustic matching layer with the relatively low density and relatively low sonic velocity, which is provided closer to the gas, achieves so high a degree of acoustic impedance matching with the gas, functioning as the ultrasonic wave propagating medium, as to increase the sensitivity sufficiently. In addition, the second acoustic matching layer with the relatively high density and relatively high sonic velocity, which is provided closer to the piezoelectric layer, ensures a good rising response as well.

Figure 9A:
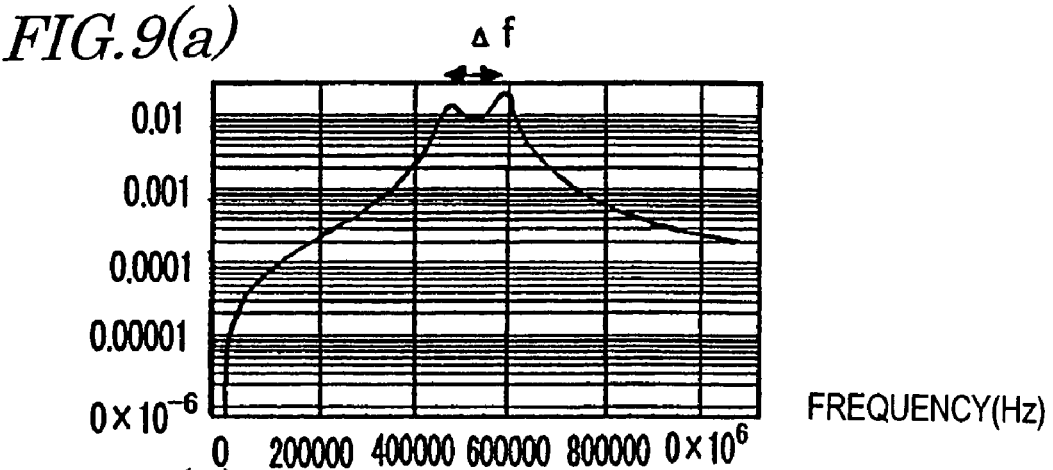
Figure 9B:
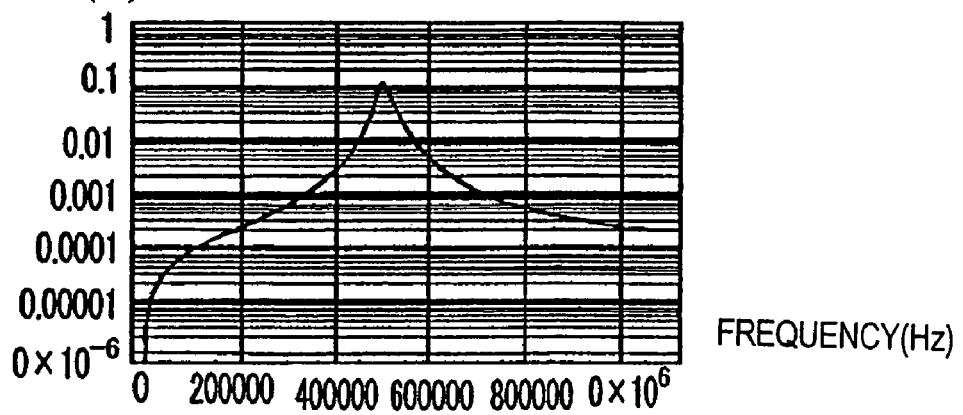
Figure 9C:
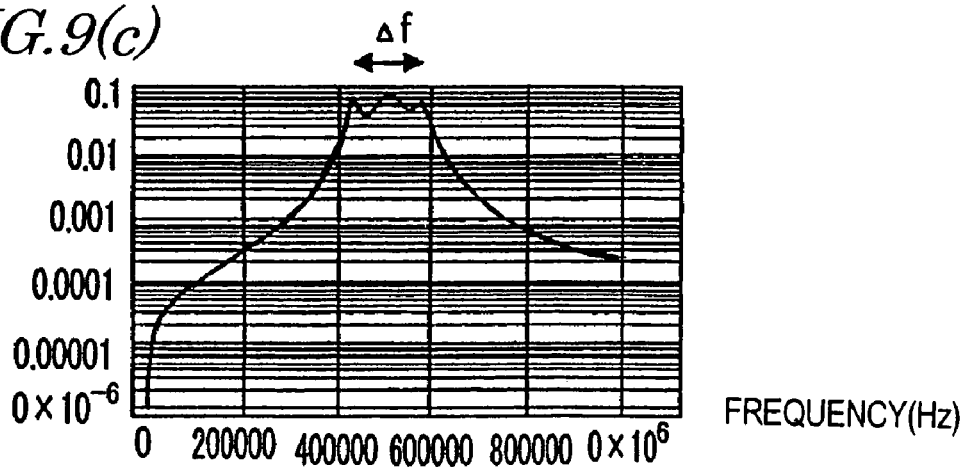

The reasons why such good characteristics were achieved will be further described with reference to FIGS. 9(a) through 9(c). FIGS. 9(a) through 9(c) show the vibration displacement frequency characteristics of the ultrasonic transducers that were used in the situations shown in FIGS. 8(a) through 8(c).

As shown in FIG. 9(a), the conventional glass balloon/epoxy acoustic matching layer cannot achieve a sufficiently high degree of acoustic impedance matching with the gas, and therefore, exhibits a bipolar characteristic and has a broad frequency range. Accordingly, the rising response to an ultrasonic pulse signal is good enough. On the other hand, the acoustic matching layer made of the silica dry gel achieves a high degree of acoustic impedance matching with the gas, and therefore, exhibits a unipolar characteristic and has a narrow frequency range as shown in FIG. 9(b). Thus, the acoustic matching layer exhibits high sensitivity but a bad rising response to a pulse signal. This is because the acoustic matching layer is slow in response to changes occurring at a higher frequency than the resonant frequency.

As opposed to such a single acoustic matching layer, the acoustic matching layer of the present invention has a two-layered structure consisting of the first and second acoustic matching layers, and therefore, exhibits a three-pole vibration displacement frequency characteristic and has a broadened frequency range as shown in FIG. 9(c). Accordingly, the rising response becomes faster. In addition, since the first acoustic matching layer, facing the gas, achieves a high degree of acoustic impedance matching with the gas as the ultrasonic wave propagating medium, the attenuation occurs just slightly and high sensitivity is achieved.

By using the acoustic matching layer having the two-layered structure according to this embodiment of the present invention, the ultrasonic transducer for use to carry out measurements by radiating an ultrasonic wave into a gas can transmit or receive the ultrasonic wave at a sufficiently high sensitivity and with good response, none of which was achievable by any conventional single acoustic matching layer. In addition, by using such an ultrasonic transducer, high sensitivity and little performance variation are achieved, and therefore, an ultrasonic flowmeter, which can measure the flow rate with significantly increased stability, can be obtained. It should be noted that the acoustic matching layer according to this embodiment of the present invention typically has the two-layered structure but may also consist of three or more acoustic matching layers if the acoustic matching layers are arranged so as to increase their densities toward the piezoelectric layer (i.e., decrease their densities toward the propagating medium).

Hereinafter, specific embodiments of the present invention will be described with reference to the accompanying drawings.

Embodiment 1

FIG. 1 schematically shows the structure of an acoustic matching layer 1 according to an embodiment of the present invention.

The acoustic matching layer 1 has a structure obtained by stacking a first acoustic matching layer 2 with a density of 50 kg/m$^3$ to 500 kg/m$^3$ on a second acoustic matching layer 3 with a density of 400 kg/m$^3$ to 1,500 kg/m$^3$. It should be noted that the density of the second acoustic matching layer 3 is higher than that of the first acoustic matching layer 2.

It is the role of the first acoustic matching layer 2 to achieve a high degree of acoustic impedance matching with the gas (i.e., the ultrasonic wave propagating medium) and thereby increase the sensitivity. In this case, the acoustic impedance Za of the first acoustic matching layer 2 and the acoustic impedance Zb of the second acoustic matching layer 3 preferably satisfy the inequality Za<Zb. The first acoustic matching layer 2 preferably has an acoustic impedance of about 11×10$^4$ kg/s·m$^2$, which is a preferred value to achieve acoustic impedance matching between the air and a piezoceramic, for example. However, if an ultrasonic transducer including the acoustic matching layer of the present invention is used to measure the flow rate of another gas (e.g., a combustible gas), then the first acoustic matching layer may have an acoustic impedance of about 5×10$^4$ kg/s·m$^2$ (which is a preferred value against hydrogen) to about 12×10$^4$ kg/s·m$^2$ (which is a preferred value against propane). Also, considering other gases and mixtures, it is particularly preferable that the acoustic impedance of the first acoustic matching layer falls within the range of 5×10$^4$ kg/s·m$^2$ to 20×10$^4$ kg/s m$^2$. Furthermore, sufficiently high sensitivity is still achieved in an acoustic impedance matched region of the first acoustic matching layer 2 even if the degree of acoustic impedance matching with the gas is somewhat decreased. Accordingly, the acoustic impedance of the first acoustic matching layer 2 may be at most 50×10$^4$ kg/s·m$^2$ and is preferably in the range of 0.5×10$^4$ kg/s·m$^2$ to 50×10$^4$ kg/s·m$^2$.

To achieve such an acoustic impedance, the first acoustic matching layer 2 needs to have a density of 50 kg/m$^3$ to 500 kg/m$^3$ and a sonic velocity of less than 500 m/s. In that case, the second acoustic matching layer 3 preferably has a density of 400 kg/m$^3$ to 1,500 kg/m$^3$ and a sonic velocity of at least 500 m/s. In any case, these values should be defined such that Za<Zb is satisfied. It should be noted that the acoustic impedance Zb of the second acoustic matching layer 3 is preferably smaller than that of the piezoelectric layer to emit the ultrasonic wave.

Also, to increase the sensitivity by achieving the acoustic impedance matching, the thickness of the acoustic matching layer also needs to be adjusted appropriately. When the reflectance of the ultrasonic wave being transmitted through the acoustic matching layer, which is obtained based on the reflection coefficient at the boundary between the acoustic matching layer and the ultrasonic wave propagating medium and the reflection coefficient at the boundary between the acoustic matching layer and the ultrasonic vibrator, becomes minimum (i.e., when the thickness of the acoustic matching layer is equal to a quarter of the oscillation wavelength of the ultrasonic wave), the transmission intensity thereof becomes maximum. Accordingly, a structure in which the first acoustic matching layer 2 has a thickness that is approximately equal to a quarter of the oscillation wavelength of the ultrasonic wave being propagated through the acoustic matching layer 2, can increase the sensitivity effectively. In the same way, a structure in which the second acoustic matching layer 3 has a thickness that is approximately equal to a quarter of the oscillation wavelength of the ultrasonic wave being propagated through the acoustic matching layer 3, is also effective. And it is most effective to set the thickness of each of the first and second acoustic matching layers 2 and 3 approximately equal to the quarter wavelength. It should be noted that "approximately quarter of the oscillation wavelength of the ultrasonic wave" refers herein to the range of one eighth to three-eighths of the wavelength. This is because if the thickness does not reach this range, then the acoustic matching layer does not work properly. On the other hand, if the thickness exceeds this range, then the wavelength is close to a half wavelength, at which the reflectance reaches a local maximum, and the sensitivity rather drops.

The materials of the acoustic matching layer 1 of the present invention are preferably selected such that the first acoustic matching layer 2 has a density of 50 kg/m$^3$ to 500 kg/m$^3$ and a sonic velocity of less than 500 m/s and that the second acoustic matching layer 3 has a density of 400 kg/m$^3$ to 1,500 kg/m$^3$ and a sonic velocity of at least 500 m/s.

Examples of specific materials of the first acoustic matching layer 2 include organic polymers and fiber bodies, foam bodies, sintered porous bodies and dry gels of inorganic materials. Among other things, a dry gel is particularly preferred.

As used herein, the "dry gel" is a porous body to be produced by a sol-gel process. Specifically, the dry gel is obtained by forming a solid skeleton through a reaction of a gel material solution, dissolving the skeleton in a solvent to obtain a wet gel, and then drying the wet gel to remove the solvent.

The dry gel is obtained by drying the wet gel with the solvent removed therefrom. This drying process step may be carried out either by a drying method requiring special conditions (e.g., supercritical drying and freeze drying) or by a normal drying method such as heat drying, low-pressure drying and air drying.

The supercritical drying technique is a method of removing the solvent in a supercritical state in which the temperature and pressure of the solvent are raised at least equal to those at the critical point thereof. In this method, there is no gas-liquid interface and no drying stress is placed on the skeleton of the gel. Thus, a dry gel with a very low density can be obtained without shrinking at all. However, the dry gel obtained by the supercritical drying technique may be subject to some operating environment stress such as condensation, thermal stress, chemical stress and mechanical stress.

On the other hand, a dry gel obtained by a normal drying method can resist the drying stress and is also highly resistant to the operating environment stress to which the dry gel will be subject after that. To obtain a low-density dry gel by such a normal drying method, the skeleton of the wet gel yet to be dried needs to be strengthened so as to bear the stress. The skeleton may be strengthened by ripening the skeleton, appropriately adjusting the temperature condition or using an easily polymerizable polyfunctional hydrophobizing agent in the hydrophobizing process step or controlling the size of micropores. Particularly when the flow rate of a gas should be measured, the acoustic matching layer may be used under various environments. Accordingly, the acoustic matching layer is preferably made of a dry gel that has been obtained by a normal drying method. Also, when a normal drying method is used, the equipment can be simplified and handled more easily because no high-pressure process is required unlike the supercritical drying method.

The dry gel obtained by the above method is a nanoporous body in which continuous pores with average pore diameters of 1 nm to 100 nm are defined by the nanometer-scale solid skeleton. Accordingly, when the density is as low as 500 kg/m$^3$ or less (preferably 400 kg/m$^3$ or less), the velocity of sound being propagated through the solid portion of the dry gel, which defines a unique network skeleton, is extremely low. In addition, the velocity of sound being propagated through the gas portion of the porous body is also extremely low due to the presence of those micropores. Accordingly, this acoustic matching layer has as low a sonic velocity as 500 m/s or less, thus achieving low acoustic impedance.

Furthermore, at the nanometer-scale micropores, the sizes of the micropores are approximately equal to, or smaller than, the mean free path of the gas molecules, and the pressure loss of the gas is significant. For that reason, even when such a porous body is used as the acoustic matching layer, the porous body can also radiate acoustic waves at a high sound pressure.

It should be noted that the dry gel may be made of any of various materials including inorganic materials and organic polymer materials. The skeleton of an inorganic oxide dry gel may be made of silicon dioxide (silica), aluminum oxide (alumina) or any other normal ceramic obtained by a sol-gel process. Also, the skeleton of an organic polymer dry gel may be made of a normal thermosetting resin or thermoplastic resin such as polyurethane, polyurea and phenol resins, polyacrylamide and polymethyl methacrylate.

Alternatively, a powder obtained by pulverizing any of these dry gels (i.e., a powder dry gel) may also be used.

Examples of the materials of the second acoustic matching layer 3 include fiber bodies, foam bodies and sintered porous bodies of organic polymers or inorganic materials, materials obtained by solidifying a glass balloon or a plastic balloon with a resin material, and materials obtained by thermally compressing a glass balloon.

The second acoustic matching layer 3 is preferably made of a material that achieves a higher density, a high sonic velocity and a greater acoustic impedance than the first acoustic matching layer 2. More specifically, a material with a density of 400 kg/m$^3$ to 1,500 kg/m$^3$ is used. When the density falls within this range, a sensitivity that is high enough to transmit or receive an ultrasonic wave is achieved without significantly decreasing the degree of acoustic impedance matching with the gas as the ultrasonic wave propagating medium and good response is also realized. However, if the density exceeds this range, then the acoustic impedance of the second acoustic matching layer 3 tends to be close to that of the piezoelectric body. In that case, the effects achieved by the acoustic matching layer of the present invention decrease, and the high sensitivity and good response are not realized simultaneously. The highest allowable density of the second acoustic matching layer 3 may be 800 kg/m$^3$.

An acoustic matching layer obtained by molding a glass balloon with a thermosetting resin, a silicon dioxide porous body acoustic matching layer obtained by mixing a silicon dioxide material with polymer beads, baking the mixture and removing the polymer, or an acoustic matching layer obtained by thermally binding (or thermally compressing) a glass balloon is preferably used as the second acoustic matching layer 3.

If the second acoustic matching layer 3 has the continuous pore structure, then the material solution, in particular, may permeate the second acoustic matching layer 3 while the first acoustic matching layer 2 is being made of a dry gel. In that case, the first acoustic matching layer 2 may be formed while leaving the second acoustic matching layer 3 permeated with the material solution. Alternatively, to avoid such permeation, a structure supporting layer may be provided on the surface of the second acoustic matching layer 3. However, if the first acoustic matching layer 2 has partially permeated the second acoustic matching layer 3, then the degree of contact between them increases advantageously. Accordingly, the structure may be determined according to the specific combination of the first and second acoustic matching layers 2 and 3.

If the first and second acoustic matching layers 2 and 3 are both made of inorganic oxides, then high reliability is achieved in terms of moisture resistance and chemical resistance and the acoustic impedance can also exhibit excellent temperature characteristic. Specifically, by using a dry gel of an inorganic oxide, an acoustic matching layer, of which the variation in acoustic impedance per temperature is −0.04%/° C. or less (i.e., has an absolute value of 0.04%/° C. or less) in the range of 25° C. to 70° C., can be obtained. In contrast, if the conventional epoxy and glass balloon or organic polymer gel is used, then it is difficult to decrease the absolute value of the variation in acoustic impedance per temperature to 0.04%/° C. or less.

If the variation in acoustic impedance per temperature is small, high measuring precision is achieved in a broad temperature range when the acoustic matching layer is applied to an ultrasonic flowmeter as will be described later.

Also, the first and second acoustic matching layers of the present invention are preferably chemically bonded together. Then, a high degree of contact is ensured even against ultrasonic vibrations, handling is easy, and durability against the vibrations of the ultrasonic transducer being used can also be increased. In that case, if the inorganic oxide dry gel of the first acoustic matching layer is silicon dioxide, then the acoustic matching layer can be easily formed by the sol-gel process. Furthermore, if the second acoustic matching layer 3 is also made of silicon dioxide, then unwanted effects on performance due to the difference in material would be reduced. In such a configuration, a hydroxide group on the surface of the silicon dioxide of the second acoustic matching layer 3 easily forms a chemical bond with a silanol group produced when the first acoustic matching layer 2 is formed by a sol-gel process, thus causing advantageous effects.

Also, if the acoustic matching layer is made of an inorganic oxide, then water should be absorbed and moisture resistance might be a problem. Accordingly, the inorganic oxide skeleton is preferably hydrophobized (or water repellent). In that case, even if water or impurities exist in the gas under measurement, the acoustic matching layer would not be affected by their absorption or deposition so easily. As a result, a more reliable acoustic matching layer can be obtained.

The inorganic oxide skeleton may be hydrophobized with a surface treating agent such as a silane coupling agent. Examples of preferred surface treating agents include: halogen silane treating agents such as trimethylchlorosilane, dimethyldichlorosilane, methyltrichlorosilane and ethyltrichlorosilane; alkoxy silane treating agents such as trimethylmethoxy silane, trimethylethoxysilane, dimethyldimethoxysilane and methyltriethoxysilane; silicone silane treating agents such as hexamethyldisiloxane and dimethylsiloxane oligomer; amine silane treating agents such as hexamethyldisilazane; and alcohol treating agents such as propyl alcohol, butyl alcohol, hexyl alcohol, octanol and decanol.

Also, if a fluorination treating agent, obtained by substituting fluorine for part or all of hydrogen of the alkyl group included in any of these treating agents, is used, then not only hydrophobization (water repellency) but also oil repellency and soil resistance are achieved effectively.

Embodiment 2

FIG. 2 schematically illustrates a cross-sectional structure of a piezoelectric vibrator 8 for use in an ultrasonic transducer according to an embodiment of the present invention. The piezoelectric vibrator 8 is used in an ultrasonic transducer for an ultrasonic flowmeter.

The piezoelectric vibrator 8 for converting electricity into ultrasonic waves, or vice versa, includes a piezoelectric layer 4 and the acoustic matching layer 1 of the first embodiment described above. The piezoelectric layer 4 generates ultrasonic vibrations, is made of a piezoceramic or piezoelectric single crystals, for example, is polarized in the thickness direction, and includes electrodes (not shown) on the upper and lower surfaces thereof. As described above, the acoustic matching layer 1 either transmits an ultrasonic wave into a gas or receives an ultrasonic wave that has been propagated through a gas. The acoustic matching layer 1 functions such that the mechanical vibrations of the piezoelectric layer 4 to be excited by an AC drive voltage are efficiently radiated as ultrasonic waves into an external medium or that the incoming ultrasonic wave is converted into a voltage efficiently. And the acoustic matching layer 1 is provided on one surface of the piezoelectric layer 4 so as to define an ultrasonic wave transmitting/receiving surface for the piezoelectric layer 4.

To increase the mechanical strength of the acoustic matching layer and to handle it more easily, a structure supporting layer may be further provided between the first and second acoustic matching layers 2 and 3 of the acoustic matching layer 1. The structure supporting layer preferably has a density of at least 800 kg/m$^3$, more preferably 1,000 kg/m$^3$ or more, and preferably has a thickness that is less than one eighth of the wavelength $\lambda$ of the acoustic wave being propagated through the structure supporting layer. That is to say, the structure supporting layer has a high density and a high sonic velocity. Accordingly, if the thickness of the structure supporting layer is sufficiently smaller than the oscillation wavelength of the ultrasonic wave, then the structure supporting layer hardly affects the transmission or reception of the ultrasonic wave. The structure supporting layer may be made of a metal material, a ceramic, an inorganic sheet of glass, for example, or a protective coating such as a plastic sheet. If the first and second acoustic matching layers 2 and 3 have been bonded together by way of an adhesive layer (i.e., an adhesive or an adhesive sheet), then the adhesive layer functions as the structure supporting layer.

In a structure in which the piezoelectric layer 4 is adhered onto an inside surface of a case and the acoustic matching layer 1 is adhered onto an outside surface of the case, the top plate of the case, provided between the piezoelectric layer 4 and the acoustic matching layer 1, functions as the structure supporting layer.

Optionally, a structure supporting layer may also be provided on the surface of the first acoustic matching layer 2 so as to face the gas. Even so, the structure supporting layer is also made of a material with a high density. Accordingly, the acoustic matching layer 1 can be handled more easily. In addition, since the degree of contact increases, the durability also increases effectively.

Embodiment 3

FIG. 3 schematically illustrates a cross-sectional structure of an ultrasonic transducer according to an embodiment of the present invention.

The ultrasonic transducer 10A shown in FIG. 3 includes a piezoelectric vibrator that is made up of the acoustic matching layer 1 of the first embodiment described above and the piezoelectric layer 4.

The ultrasonic transducer 10A further includes a case (sealing container) 5. The case 5 includes a top plate 5a that defines a concave portion to embed the piezoelectric layer 4 therein and a bottom plate 5b that is arranged so as to close up the inner space of the concave portion hermetically. The piezoelectric layer 4 is bonded (or adhered) onto the inside surface of the top plate 5a of the case 5 while the acoustic matching layer 1 is bonded (or adhered) onto the upper surface of the top plate 5a so as to face the piezoelectric layer 4 by way of the top plate 5a.

The top plate 5a, located between the piezoelectric layer 4 and the acoustic matching layer 1, also functions as the structure supporting layer. The thickness of the top plate 5a is preferably sufficiently smaller than the oscillation wavelength of the ultrasonic wave, and is preferably less than one eighth of the wavelength $\lambda$ of the acoustic wave being propagated through the top plate 5a. Also, the top plate 5a preferably has a density of at least 800 kg/m$^3$, more preferably 1,000 kg/m$^3$ or more.

If the case 5 is made of a conductive material (e.g., a metal material), then the case 5 functions not only as a structure supporting member but also as an electrode (or interconnect) to oscillate the piezoelectric layer 4 or sense the ultrasonic wave received. One of the electrodes (not shown), provided on the two principal surfaces of the piezoelectric layer 2, is connected to one terminal 7 by way of the case 1, while the other electrode is connected to the other terminal 7 by way of a wire, for example. Accordingly, the case 1 is normally made of a metal with electrical conductivity. It should be noted that the other terminal 7 is electrically isolated from the case 5 via an insulator 6.

The acoustic matching layer 1, which is provided so as to face the piezoelectric layer 4 by way of the top plate 5a of the case 5, includes the second acoustic matching layer 3 and the first acoustic matching layer 2, which are stacked in this order from the piezoelectric layer 4 toward the medium into which the ultrasonic wave is radiated. By arranging the acoustic matching layer 1 in this manner, an ultrasonic transducer 10 with high sensitivity and good response can be obtained as already described with reference to FIGS. 8(c) and 9(c).

If a combustible gas is the object to be sensed, then the piezoelectric layer 4 can be isolated from the gas by embedding the piezoelectric layer 4 in the case 5. The inner space (i.e., the concave portion) of the case 5 is preferably purged away with an inert gas such as nitrogen gas. In that case, even when this ultrasonic transducer is applied to an ultrasonic flowmeter in a combustible gas, a high degree of safety is still ensured advantageously. Also, the material of the acoustic matching layer to be exposed to the combustible gas preferably neither reacts with the gas nor burns. From this point of view, the acoustic matching layer is also preferably made of an inorganic oxide.

In the ultrasonic transducer 10A having such a configuration, when a burst signal voltage, having an AC signal component with a frequency that is close to the resonant frequency of the ultrasonic transducer, is applied to the drive terminal 7, the piezoelectric layer 4 vibrates in a thickness vibration mode, and radiates a burst ultrasonic wave into the fluid such as a gas or a liquid.

Embodiment 4

Figure 4:
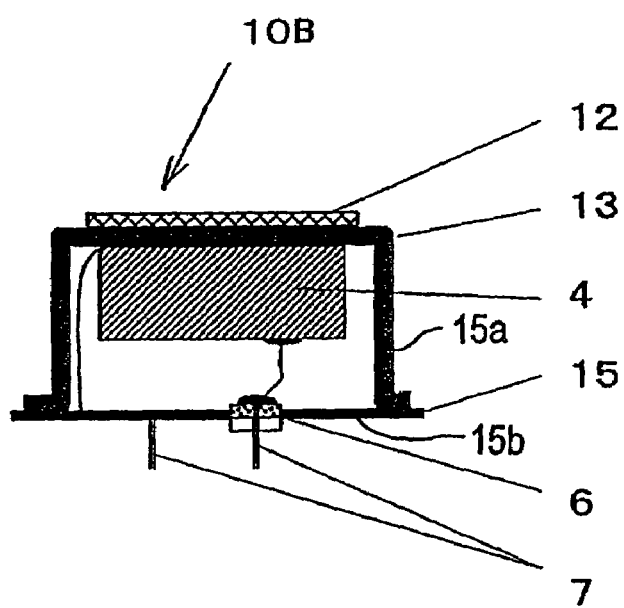
FIG. 4 is a cross-sectional view showing an ultrasonic transducer as a fourth embodiment of the present invention.

FIG. 4 illustrates a cross-sectional structure of an ultrasonic transducer according to an embodiment of the present invention.

In the ultrasonic transducer 10B shown in FIG. 4, a portion of a case 15 defines a second acoustic matching layer 13, the piezoelectric layer 4 is provided on the inside surface of the second acoustic matching layer 13 of the case 15, and a first acoustic matching layer 12 is provided on the outside surface of the second acoustic matching layer 13 so as to face the piezoelectric layer 4. The second acoustic matching layer 13 also functions as a structure supporting layer. Accordingly, the second acoustic matching layer 13 is preferably made of a material with a relatively high density. With the second acoustic matching layer 13 only, it is difficult to match the acoustic impedance to that of the gas as the ultrasonic wave propagating medium. However, by stacking the first acoustic matching layer 12 on the second acoustic matching layer 13 as shown in FIG. 4, acoustic impedance can be matched to that of the gas and high sensitivity is achieved.

Embodiment 5

Figure 5:
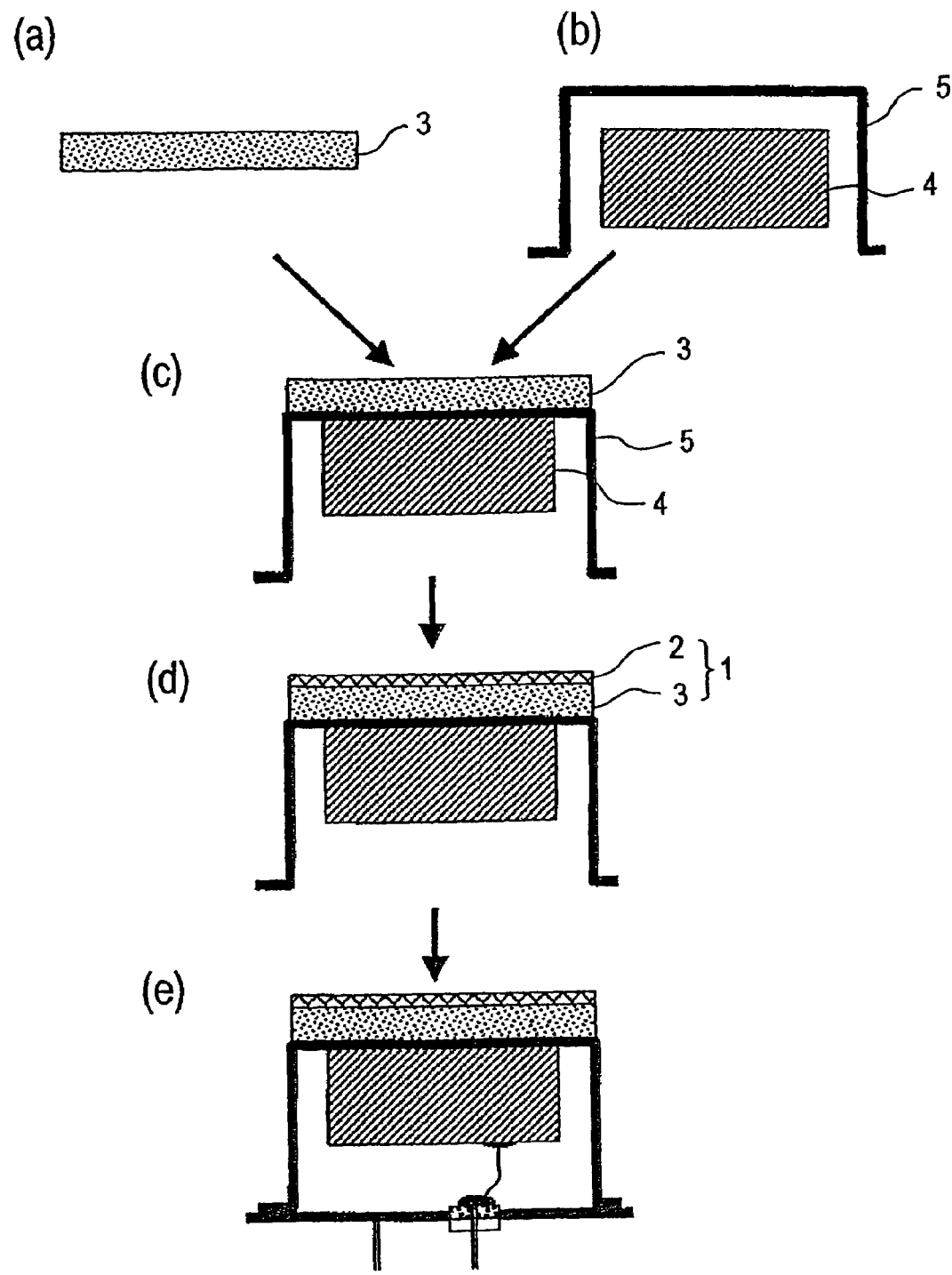
FIG. 5 schematically shows the steps (a) through (e) of an ultrasonic transducer manufacturing process according to an embodiment of the present invention.

FIG. 5 shows a method for fabricating an ultrasonic transducer according to an embodiment of the present invention.

The ultrasonic transducer manufacturing process of this embodiment includes the process steps of: forming a second acoustic matching layer either on a piezoelectric layer or on a case that already includes the piezoelectric layer on the inside surface thereof; and stacking a first acoustic matching layer of a dry gel on the second acoustic matching layer.

Specifically, this manufacturing process includes the steps of:

(a): preparing a second acoustic matching layer 3;

(b): preparing a piezoelectric layer 4 and a case 5;

(c): bonding the piezoelectric layer 4 and the second acoustic matching layer 3 onto the case 5 with an adhesive, for example;

(d): forming a first acoustic matching layer of a dry gel on the second acoustic matching layer 3; and (e): attaching electrodes and a terminal plate 5b (i.e., the bottom plate of the case 5) to the assembly to obtain an ultrasonic transducer.

The process step (d) of forming the first acoustic matching layer 2 includes the steps of: coating the surface of the second acoustic matching layer 3 with a gel material solution; solidifying the gel material solution into a wet gel; and drying the resultant wet gel layer with the solvent removed therefrom, thereby obtaining a dry gel layer. Optionally, the first acoustic matching layer 2 of a dry gel may be separately prepared in advance and then bonded onto the second acoustic matching layer 3 with an adhesive, for example. According to the method described above, however, the first and second acoustic matching layers 2 and 3 can be directly bonded together with no adhesive layer interposed between them. This is why this method is preferred.

To increase the durability of the stacking structure consisting of the first and second acoustic matching layers 2 and 3, the first and second acoustic matching layers 2 and 3 may be chemically bonded together. For example, if the second acoustic matching layer 2 is made of an inorganic oxide and if the surface of the second acoustic matching layer 3 has been treated by cleaning, for example, such that a hydroxide group is present on the surface, then a chemical bond may be formed between them while the first acoustic matching layer 2 is being formed of the inorganic oxide dry gel. Examples of preferred treating methods of producing a hydroxide group on the surface include acid or alkali cleaning, water washing, exposure to ultraviolet rays, ozone processing and oxygen plasma processing.

Also, if the second acoustic matching layer 3 is a continuous porous body, then the gel material solution of the first acoustic matching layer 2 permeates the second acoustic matching layer 3, thus forming a stronger chemical bond between them. In that case, the first and second acoustic matching layers 2 and 3 are preferably made of the same inorganic oxide. By chemically bonding the first and second acoustic matching layers 2 and 3 together, the acoustic bonding can be strengthened, the sensitivity can be increased, and the performance and reliability can be improved advantageously.

Embodiment 6

Figure 6:
FIG. 6 schematically shows the steps (a) through (e) of an ultrasonic transducer manufacturing process according to another embodiment of the present invention.
Figure 6:
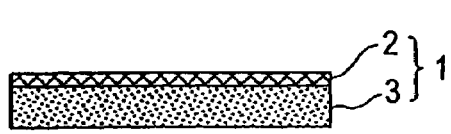
Figure 6:
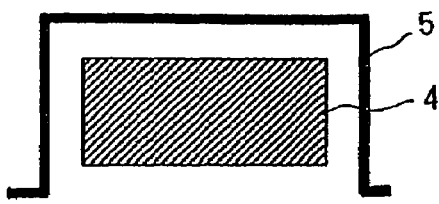
Figure 6:
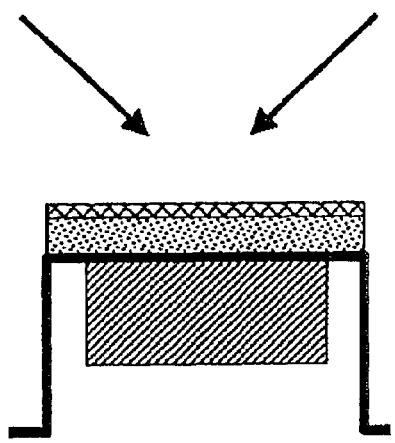
Figure 6:
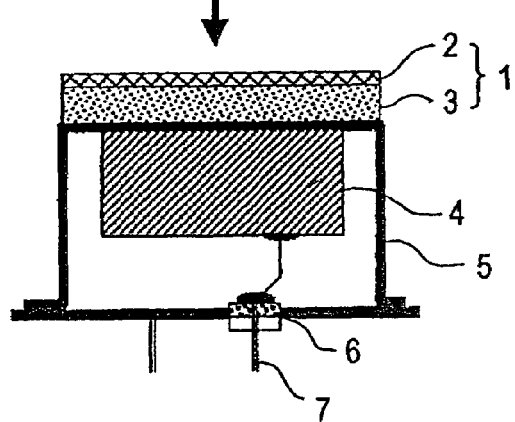

FIG. 6 shows a method for fabricating an ultrasonic transducer according to another embodiment of the present invention.

The ultrasonic transducer manufacturing process of this embodiment includes the process steps of: forming an acoustic matching layer 1 by stacking a first acoustic matching layer 2 of a dry gel on one surface of a second acoustic matching layer 3; and bonding the acoustic matching layer 1 either on a piezoelectric layer 4 or on a case 5 that already includes the piezoelectric layer 4 on the inside surface thereof.

Specifically, this manufacturing process includes the steps of:

(a): preparing a second acoustic matching layer 3;

(b): stacking a first acoustic matching layer 2 on one surface of the second acoustic matching layer 3. This stacking process step includes the steps of: coating the surface of the second acoustic matching layer 3 with a gel material solution; solidifying the gel material solution into a wet gel; and drying the resultant wet gel layer with the solvent removed therefrom, thereby obtaining a dry gel layer. Optionally, the first acoustic matching layer 2 of a dry gel may be separately prepared in advance and then bonded onto the second acoustic matching layer 3 with an adhesive, for example. According to the method described above, however, the first and second acoustic matching layers 2 and 3 can be directly bonded together with no adhesive layer interposed between them. This is why this method is preferred. Also, to increase the durability of the stacking structure consisting of the first and second acoustic matching layers, the same method as that already described for the sixth embodiment may be used as well;

(c): preparing a piezoelectric layer 4 and a case 5;

(d): bonding the acoustic matching layer 1 as the stack of the first and second acoustic matching layers 2 and 3 and the piezoelectric layer 4 onto the case 5 with an adhesive, for example; and (e): attaching electrodes and a terminal plate 5b (i.e., the bottom plate of the case 5) to the assembly to obtain an ultrasonic transducer.

Embodiment 7

Figure 7A:
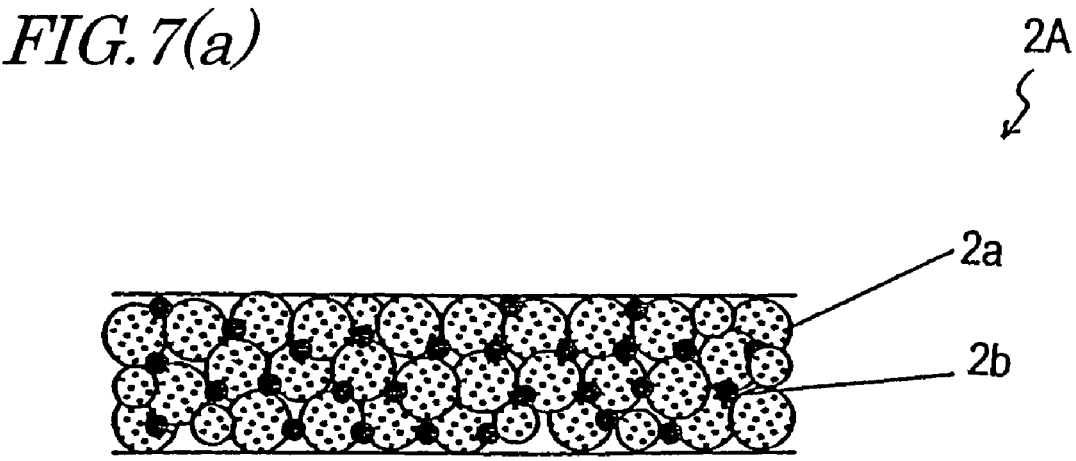
FIGS. 7($a$) and 7($b$) schematically show structures of first acoustic matching layers, which are preferably used in an acoustic matching layer according to an embodiment of the present invention and which each include a powder dry gel.

The first acoustic matching layer 2 may also be made of a powder of a dry gel. The first acoustic matching layer 2A shown in FIG. 7(a) is made up of a dry gel powder (which will be sometimes referred to herein as a "powder dry gel")

2a and an additive 2b. By making the first acoustic matching layer 2A of the dry gel powder, variation in characteristic, which would otherwise be caused by the non-uniformity of the wet gel being dried, can be minimized. In addition, by using the powder dry gel 2a, the productivity of the ultrasonic transducers can be increased because the powder dry gel 2a can be prepared in advance. That is to say, in the ultrasonic transducer manufacturing process described above, the process steps of solidifying the gel material solution into a wet gel and drying the wet gel can be carried out in advance, thus increasing the throughput of the ultrasonic transducers being manufactured.

The powder dry gel 2a preferably has a mean particle size of 1 $\mu$m to 100 $\mu$m. The reasons are as follows. Specifically, if the mean particle size was smaller than this lower limit, then the number of micropores in the powder would decrease so much as to diminish the effects unique to the dry gel. In addition, the amount of the additive needed in the compacting process step would increase too much to obtain a low-density acoustic matching layer easily. On the other hand, if the mean particle size of the powder dry gel 2a was greater than the upper limit, then it would be difficult to control the thickness of the acoustic matching layer. In that case, an acoustic matching layer with a sufficiently uniform thickness and a sufficiently flat surface might be hard to obtain.

As the additive (or binder) 2b to bond together the particles of the powder dry gel 2a and thereby increase the mechanical strength of the acoustic matching layer 2A, a polymer powder with thermal binding property is preferably used. If a liquid material is used, then the liquid material may permeate the micropores of the dry gel to affect the acoustic performance or decrease the compactability. For that reason, a solid material (e.g., a powder among other things) is preferably used.

As used herein, the "thermal binding polymer" refers to a polymer which is solid at room temperature, melts or softens when heated, and then solidifies. Examples of preferred thermal binding polymers include not only normal thermoplastic resins (i.e., engineering plastics such as polyethylene and polypropylene) but also thermosetting resins, which are solid at room temperature, once soften when heated but crosslink and cure thereafter (e.g., phenol resins, epoxy resins and urethane resins). Also, if a thermosetting resin includes a main agent and a curing agent, then these two agents may be added as separate powders. Naturally, a mixture of a thermoplastic resin and a thermosetting resin may also be used. The thermal binding polymer powder preferably has a melting (or softening) temperature of 80° C. to 250° C.

In the process step of pressing and compacting the mixture of the powder dry gel 2a and the additive while heating the mixture, the thermal binding polymer used as the additive typically melts or softens once, and then solidifies and/or crosslinks and cures when cooled, thereby bonding the particles of the powder dry gel 2a together as will be described later.

The thermal binding polymer powder preferably has a mean particle size of 0.1 $\mu$m to 50 $\mu$m. The reasons are as follows. Specifically, if the mean particle size was smaller than this lower limit, then the size would be close to the pore diameter of the powder dry gel, thus possibly decreasing the binding property or compactability. On the other hand, if the mean particle size was greater than the upper limit, then the amount of the additive needed in the compacting process step would increase too much to obtain a low-density acoustic matching layer easily.

Also, the amount of the thermal binding polymer powder to be added is preferably at most 40 mass % of the overall mixture. This is because if the polymer powder was added to more than 40 mass % of the overall mixture, then the density of the resultant compact might be too high. However, to achieve a sufficient mechanical strength, the amount of the polymer powder added is preferably at least 5 mass % of the overall mixture.

Figure 7B:
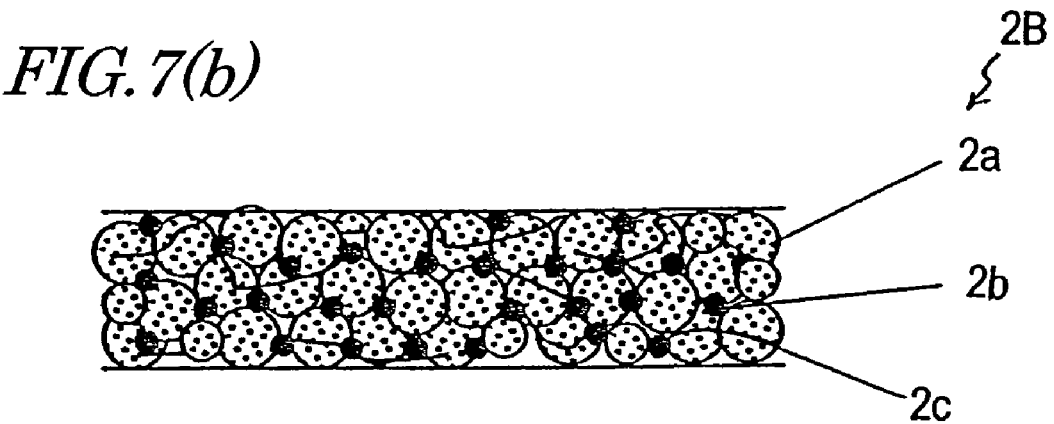

To strengthen the bond between the additive described above (which will be sometimes referred to herein as "additive A") and the powder dry gel, a fiber such as an inorganic fiber (e.g., glass wool) or an organic fiber or a whisker (which will be sometimes referred to herein as "additive B") may be further added as in the acoustic matching layer 2B schematically shown in FIG. 7(b). In the acoustic matching layer 2B shown in FIG. 7(b), the additive 2b is the same thermal binding polymer powder as that described above, while the additive 2c is a short fiber. The preferred diameter range of the short fiber substantially corresponds with the preferred mean particle size range of the thermal binding polymer powder. The fiber preferably has a length of about several $\mu$m to about several mm.

The total amount of these two additives is preferably at most 40 mass % of the overall mixture. The mixture ratio is appropriately defined depending on the necessity.

Furthermore, the acoustic matching layer made of the powder dry gel can have its acoustic impedance adjusted easily. For example, if multiple types of powder dry gels with mutually different densities are mixed together, the acoustic impedance can be adjusted. The acoustic impedance can also be adjusted by changing the amount(s) of the additive A (and the additive B if necessary). Naturally, the amounts of the additives A and B preferably fall within the ranges defined above in view of the compactability, for example.

The first acoustic matching layer 2B including the powder dry gel may be formed by performing the process steps of:
(a): preparing a low-density powder dry gel of a porous body (with a density of about 200 kg/m$^3$ to about 400 kg/m$^3$) and additives A and B, which account for about 10 mass % of the overall mixture. In this process step, the dry gel to be prepared does not have to be a powder but may be blocks. The dry gel may be a silica dry gel with an average pore diameter of 20 nm. The additive A may be a polypropylene powder. And the additive B may be a glass wool with a fiber diameter of about 10 $\mu$m;
(b): putting the dry gel and additives A and B into the same container, mixing them together and pulverizing the mixture, thereby obtaining a fine powder. This process step is typically carried out with a mill. In this process step, the pulverization conditions are adjusted such that a powder dry gel with the desired mean particle size described above can be obtained. Also, the powder may be classified if necessary. It is naturally possible to carry out the dry gel pulverizing process step and the mixing process step separately; and
(c): weighing the powder mixture consisting of the low-density powder dry gel and additives A and B to a desired amount and then pressing and compacting the mixture while heating it. In this process step, if the mixture is directly pressed and compacted on the surface of the second acoustic matching layer 3, then the first acoustic matching layer 2 can be directly bonded to the second acoustic matching layer 3.

It should be noted that before the powder mixture consisting of the powder dry gel and additives A and B is pressed and compacted, the upper surface of the powder mixture layer is preferably flattened by shaking the powder mixture layer, for example. Then, the property of the resultant first acoustic matching layer 2A can be made more uniform.

Embodiment 8

Figure 11:
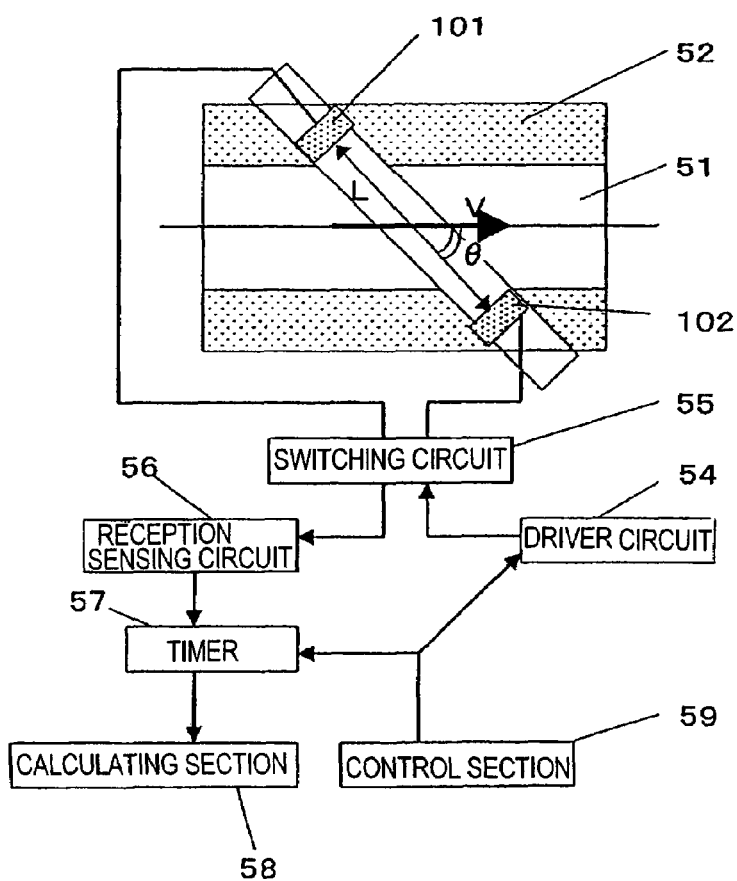
FIG. 11 is a block diagram showing an ultrasonic flowmeter including an ultrasonic transducer according to the present invention.
Figure 12:
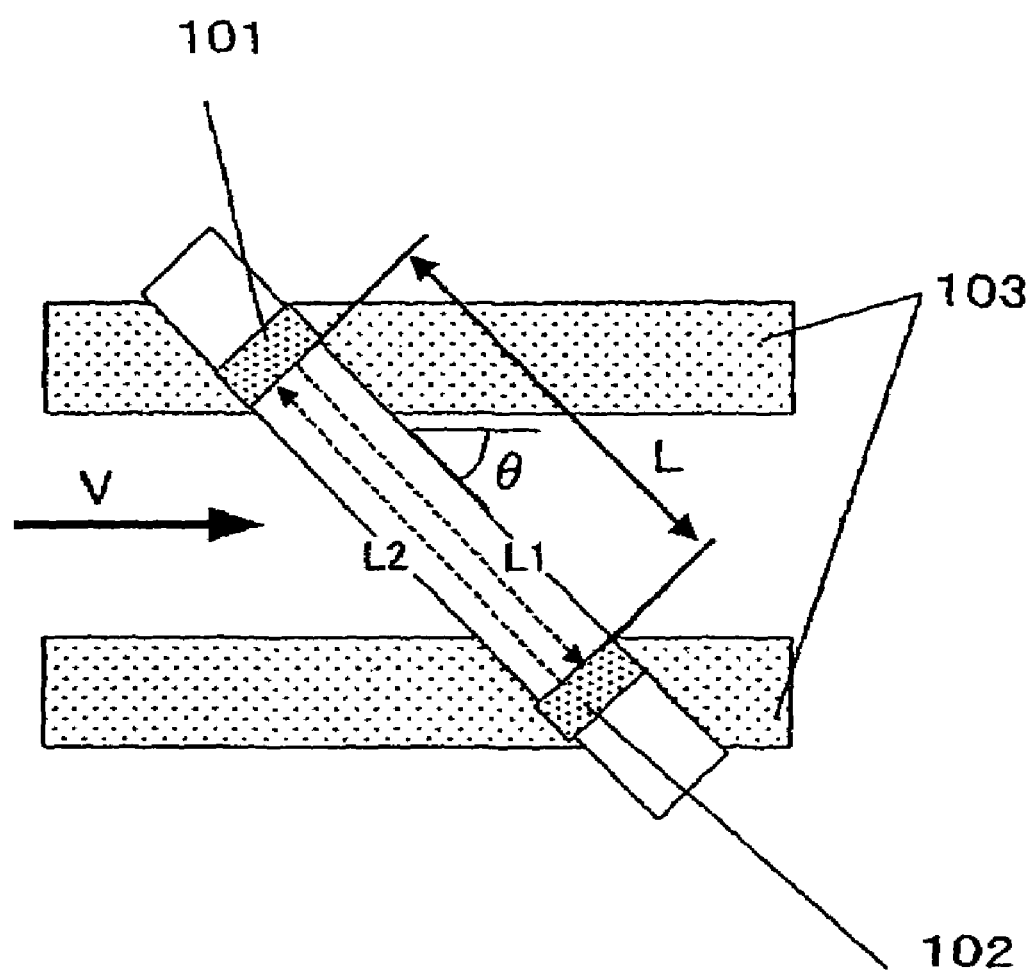
FIG. 12 is a cross-sectional view showing the measuring principle of a normal ultrasonic flowmeter.

FIG. 11 is a block diagram of an ultrasonic flowmeter including an ultrasonic transducer according to an embodiment of the present invention.

The ultrasonic flowmeter shown in FIG. 11 is arranged such that a fluid under measurement flows in the arrowed direction at a velocity V inside of a tube that functions as a flow rate measuring portion 51. Piezoelectric vibrators 101 and 102 are provided as ultrasonic transducers of the present invention on the tube wall 52 of the flow rate measuring portion 51 so as to face each other. In this case, the piezoelectric vibrator 101 is used as an ultrasonic transmitter and the piezoelectric vibrator 102 is used as an ultrasonic receiver. A driver circuit 54, a reception sensing circuit 56, a timer 57, a calculating circuit 58, and a control circuit 59 are connected to the ultrasonic transducers 101 and 102 by way of a switching circuit 55 that switches the transmission and reception of the transducers. The driver circuit 54 drives the ultrasonic transducers 101 and 102. The reception sensing circuit 56 senses an ultrasonic pulse received. The timer 57 measures the propagation time of the ultrasonic pulse. The calculating circuit 58 calculates the flow rate based on the output of the timer 57. The control circuit 59 outputs a control signal to the driver circuit 54 and timer 57.

Next, it will be described how the ultrasonic flowmeter having such a configuration operates. Suppose an LP gas is used as a fluid under measurement and the ultrasonic transducers 101 and 102 have a drive frequency of about 500 kHz. The control circuit 59 outputs a transmission start signal to the driver circuit 54 and, at the same time, instructs the timer 7 to start measuring time. On receiving the transmission start signal, the driver circuit 54 drives the ultrasonic transducer 101 such that the ultrasonic transducer 101 transmits an ultrasonic pulse. The ultrasonic pulse transmitted is propagated through the flow rate measuring portion and received at the ultrasonic transducer 102. The ultrasonic pulse received is transformed by the ultrasonic transducer 102 into an electric signal, which is then output to the reception sensing circuit 56. The reception sensing circuit 56 determines the time at which the signal was received and stops the timer 57. Then, the calculating circuit 58 calculates the propagation time t1.

Next, the switching circuit 55 switches the ultrasonic transducers 101 and 102 to be connected to the driver section 54 and the reception sensing circuit 56. Thereafter, the control circuit 59 outputs a transmission start signal to the driver circuit 54 again and, at the same time, instructs the timer 57 to start measuring time. However, as opposed to the situation where the propagation time t1 was measured, an ultrasonic pulse is transmitted from the ultrasonic transducer 102 and then received at the ultrasonic transducer 101 and the calculating circuit 58 calculates the propagation time t2.

Suppose the distance between the centers of the ultrasonic transducers 101 and 102 is L, the sonic velocity in the LP gas in no wind condition is C, the flow velocity in the flow rate measuring portion 51 is V, and the angle defined between the direction in which the fluid under measurement flows and the line that connects together the centers of the ultrasonic transducers 101 and 102 is θ. In that case, the propagation times t1 and t2 are obtained by actual measurement and the distance L is already known. Accordingly, the flow velocity V can be obtained by measuring the times t1 and t2, and the flow rate can be determined by the flow velocity V.

EXAMPLES

Hereinafter, specific examples of the present invention will be described.

Example 1

An ultrasonic transducer according to the present invention was fabricated in the following manner:

(a) Making a Second Acoustic Matching Layer of Glass Epoxy

A jig was filled with glass balloons, which were impregnated with an epoxy solution and then thermally cured at 120° C. Thereafter, this cured and molded body was cut such that the thickness thereof was equal to a quarter of the oscillation wavelength of the ultrasonic wave.

The resultant second acoustic matching layer had a sonic velocity of 2,500 m/s, a density of 500 kg/m$^3$ and a thickness of 1.25 mm with respect to an ultrasonic wave at about 500 kHz.

(b) Bonding the Second Acoustic Matching Layer and a Piezoelectric Body onto a Case An adhesive was printed on both sides of the top plate of a case, on one surface of a piezoelectric layer, and on one surface of the second acoustic matching layer. In such a state, the piezoelectric body and second acoustic matching layer are attached to the case and then the assembly was pressed and heated, thereby curing the adhesive and bonding them together.

(c) Stacking a First Acoustic Matching Layer Thereon

First, electrodialysis was carried out on soda silicate, thereby preparing an aqueous solution of silicate with pH of 9 to 10 (in which silica ingredients had a concentration of 14 wt %). Subsequently, after the pH of the silicate aqueous solution was adjusted to 5.5, the surface of the second acoustic matching layer, which had been cleaned with exposure to an ultraviolet ray so as to produce a hydroxide group thereon, was coated with the silicate aqueous solution to a thickness of 90 μm. The coating soon gelled and solidified, thereby forming a silica wet gel layer. Then, the wet gel layer was dried by a supercritical drying process at 12 MPa and 50° C. with carbon dioxide supplied into this container. In this manner, a piezoelectric vibrator case, including an acoustic matching layer as a stack of the first acoustic matching layer of silica dry gel and the second acoustic matching layer of glass epoxy, was obtained.

The first acoustic matching layer of silica dry gel had a sonic velocity of 180 m/s and a density of 200 kg/m$^3$ with respect to an ultrasonic wave at about 500 kHz.

(d) Forming an Ultrasonic Transducer

A cap plate, drive terminals and so on were assembled with the case including the acoustic matching layer, thereby completing an ultrasonic transducer.

Example 2

Another ultrasonic transducer according to the present invention was fabricated in the following manner:

(a) Making a Second Acoustic Matching Layer of a Silica Porous Body

A spherical acrylic resin with a diameter of several tens of $\mu$m and a sintered silica powder with a size of 1 $\mu$m or less were mixed together and then the mixture was pressed and compacted. The resultant compact was dried and then baked at 900° C., thereby obtaining a silica porous body. Thereafter, its thickness was adjusted so as to be equal to a quarter of the oscillation wavelength of the ultrasonic wave.

The resultant second acoustic matching layer had a sonic velocity of 1,500 m/s, a density of 570 kg/m$^3$ and a thickness of 750 $\mu$m with respect to an ultrasonic wave at about 500 kHz.

(b) Stacking a First Acoustic Matching Layer on the Second Acoustic Matching Layer A gel material solution was prepared by mixing tetramethoxysilane, ethanol and ammonia water (with a normality of 0.1) together at a mole ratio of 1 to 3 to 4. The surface of the second acoustic matching layer, which had been cleaned by a plasma cleaning process so as to produce a hydroxide group thereon, was coated with the gel material solution to a thickness of 90 $\mu$m. The coating soon gelled and solidified, thereby forming a silica wet gel layer.

The second acoustic matching layer, on which this silica wet gel layer had been formed, was hydrophobized in a hexane solution including 5 wt % of trimethylethoxysilane and then dried by a supercritical drying process at 12 MPa and 50° C. with carbon dioxide supplied thereto. In this manner, an acoustic matching layer was obtained as a stack of the silica dry gel and the second acoustic matching layer.

In this case, the hydroxide group on the second acoustic matching layer and the alkoxy group of the tetramethoxysilane reacted with each other to produce a chemical bond between them. Thus, the acoustic matching layer achieves a high degree of contact.

The first acoustic matching layer of silica dry gel had a sonic velocity of 180 m/s and a density of 200 kg/m$^3$ with respect to an ultrasonic wave at about 500 kHz.

(c) Bonding the Acoustic Matching Layer and a Piezoelectric Layer onto a Case Epoxy adhesive sheets were provisionally bound onto both sides of the top plate of a case, one surface of a piezoelectric body and one surface of the second acoustic matching layer were attached to the case, and then the assembly was pressed and heated, thereby curing the adhesive sheets and bonding them together.

(d) Forming an Ultrasonic Transducer

A cap plate, drive terminals and so on were assembled with the case, thereby completing an ultrasonic transducer.

Example 3

Still another ultrasonic transducer according to the present invention was fabricated in the following manner:

(a) Making a Second Acoustic Matching Layer of a Silica Porous Body

A sintered silica powder with particle sizes of several $\mu$m to several tens of $\mu$m was compacted. The resultant compact was baked at 900° C., thereby obtaining a silica porous body with a thickness that was approximately equal to a quarter of the oscillation wavelength of the ultrasonic wave. The resultant second acoustic matching layer of this silica porous body had a sonic velocity of about 4,000 m/s, a density of about 1,200 kg/m$^3$ and a thickness of about 2 mm with respect to the ultrasonic wave at about 500 kHz.

Next, a glass layer with a thickness of 3 $\mu$m (and a density of about 3,000 kg/m$^3$) was provided as a structure supporting layer on one surface of this second acoustic matching layer of the silica porous body. This glass layer had a sonic velocity of about 5,000 m/s. Accordingly, the wavelength of the acoustic wave being propagated increased by 1 cm with respect to the ultrasonic wave at about 500 kHz. The thickness of the glass layer provided was sufficiently smaller than one eighth of the wavelength. Thus, the glass layer did not affect acoustic matching at all.

(b) Stacking a First Acoustic Matching Layer on the Second Acoustic Matching Layer A silica wet gel was formed as in the second example described above on the glass layer of the silica porous body that had been obtained by the process step (a). The silica wet gel was hydrophobized while being heated to 40° C. to 70° C. and then heated and dried at 80° C. within a nitrogen gas, thereby obtaining an acoustic matching layer as a stack of the first acoustic matching layer of a silica dry gel and the second acoustic matching layer.

The first acoustic matching layer of the silica dry gel had a sonic velocity of 180 m/s and a density of 200 kg/m$^3$ with respect to the ultrasonic wave at about 500 kHz.

(c) Bonding the Acoustic Matching Layer and a Piezoelectric Body Onto a Case Epoxy adhesive sheets were provisionally bound onto both sides of the top plate of a case, one surface of a piezoelectric body and one surface of the second acoustic matching layer were attached to the case, and then the assembly was pressed and heated, thereby curing the adhesive sheets and bonding them together.

(d) Forming an Ultrasonic Transducer

A cap plate, drive terminals and so on were assembled with the case, thereby completing an ultrasonic transducer.

Comparative Example 1

An ultrasonic transducer, of which the acoustic matching layer consisted of the second acoustic matching layer (of glass epoxy) of the first example described above, was formed.

Comparative Example 2

An ultrasonic transducer, in which only the silica dry gel was provided as the acoustic matching layer on the case of a piezoelectric vibrator, was obtained by the method of the first example described above.

The transmission and reception performances of the first through third examples described above and the first and second comparative examples with respect to the ultrasonic wave at 500 kHz were compared with each other. Also, five ultrasonic flowmeters were obtained. Each of the ultrasonic flowmeters included a pair of ultrasonic transducers of the first, second or third example or the first or second comparative example, which were arranged so as to face each other. In this case, the performance of each ultrasonic flowmeter was evaluated by the output waveform of one of the two ultrasonic transducers that had received an acoustic wave from the other ultrasonic transducer.

It should be noted that FIGS. 8(a) through 8(c) show the results of one of these comparisons (i.e., first and second comparative examples and second example).

Sensitivity

Example 2≈Example 3>Example 1>Cmp. Ex. 2>> Cmp. Ex. 1

Rising Response

Example 1≈Example 2≈Example 3≧Cmp. Ex. 1>> Cmp. Ex. 2

As described above, the sensitivity achieved by the first example was about 10 times as high as that achieved by the conventional acoustic matching layer of the first comparative example, and the sensitivity achieved by the second and third examples was about 20 times as high as that of the first comparative example. The rising response achieved by the first, second or third example was either comparable to, or slightly better than, that achieved by the conventional acoustic matching layer of the first comparative example. Specifically, in the first comparative example shown in FIG. 8(a), the peak of the fifth wave portion of the ultrasonic wave was the largest. On the other hand, in the second example shown in FIG. 8(c), the peak of the fourth wave portion of the ultrasonic wave was the largest. Thus, the present inventors discovered that the ultrasonic transducer of each example of the present invention exhibited higher sensitivity and better rising response than the conventional one.

Example 4

Yet another ultrasonic transducer according to the present invention was fabricated in the following manner:

(a) Making a Second Acoustic Matching Layer of a Silica Porous Body

As in the third example described above, a sintered silica powder with particle sizes of several $\mu$m to several tens of $\mu$m was compacted. The resultant compact was baked at 900° C., thereby obtaining a silica porous body with a thickness that was approximately equal to a quarter of the oscillation wavelength of the ultrasonic wave. The resultant second acoustic matching layer of this silica porous body had a sonic velocity of about 4,000 m/s, a density of about 1,200 kg/m$^3$ and a thickness of about 2 mm with respect to the ultrasonic wave at about 500 kHz.

(b) Stacking a First Acoustic Matching Layer on the Second Acoustic Matching Layer A silica wet gel of a silicone oligomer of tetraethoxysilane was formed on the silica porous body, obtained by the process step (a), by using ammonia as a catalyst and isopropyl alcohol as a solvent. The wet gel was ripened at 70° C. and then hydrophobized with dimethyldimethoxy silane. Thereafter, the wet gel was air-dried to remove the solvent, thereby obtaining an acoustic matching layer in which a first acoustic matching layer of a silica dry gel was stacked on the second acoustic matching layer.

The first acoustic matching layer of the silica dry gel had a sonic velocity of about 300 m/s and a density of about 420 kg/m$^3$ with respect to the ultrasonic wave at about 500 kHz. The thickness of this first acoustic matching layer was adjusted to 150 $\mu$m, thereby obtaining a final acoustic matching layer.

(c) Bonding the Acoustic Matching Layer and a Piezoelectric Layer onto a Case

An epoxy adhesive was applied onto both sides of the top plate of a case with a recessed structure, one surface of a piezoelectric layer and the surface of the second acoustic matching layer of the acoustic matching layer were attached to the top plate of the case by way of the adhesive layer, and then the assembly was pressed and heated, thereby curing the adhesive and bonding the acoustic matching layer and piezoelectric layer to the case.

(d) Forming an Ultrasonic Transducer

A cap plate (or bottom plate) of the case, drive terminals and so on were assembled with the case, thereby completing an ultrasonic transducer.

The transmission and reception performance of a pair of ultrasonic transducers obtained in this manner was evaluated. As a result, higher sensitivity and better rising response were achieved than the first or second comparative example.

INDUSTRIAL APPLICABILITY

The present invention provides an acoustic matching layer, which is obtained by stacking a first acoustic matching layer with a low density and a low sonic velocity on a second acoustic matching layer with a higher density and a higher sonic velocity. By applying this acoustic matching layer to an ultrasonic transducer such that the first acoustic matching layer, of which the acoustic impedance is matched to that of a medium into which an ultrasonic wave is radiated, is provided closer to the medium, the ultrasonic transducer can have an acoustic impedance that is low enough to achieve a high degree of matching with the ultrasonic wave propagating medium. The ultrasonic transducer can also transmit and receive the ultrasonic wave at a high sensitivity and can increase the steepness of the signal rising response.

Also, an ultrasonic transducer, obtained by the method of the present invention, can exhibit increased sensitivity and stabilized performance by utilizing the acoustic matching layer with the low acoustic impedance.

Furthermore, since the ultrasonic transducer of the present invention exhibits high sensitivity and significantly reduced variations in performance, the ultrasonic flowmeter of the present invention can measure the flow rate with increased stability. Also, when the acoustic matching layer is made of an inorganic oxide, the flow rate can be measured with the temperature characteristics improved significantly. Also, by hydrophobizing the acoustic matching layer, a high-reliability ultrasonic flowmeter with excellent moisture resistance can be provided.

What is claimed is:

1. An acoustic matching layer for matching the acoustic impedance of a piezoelectric layer to that of a gas, the acoustic matching layer comprising:
a first acoustic matching layer having a density of 50 kg/m$^3$ to 500 kg/m$^3$; and
a second acoustic matching layer having a density of 400 kg/m$^3$ to 1,500 kg/m$^3$,
wherein the density of the first acoustic matching layer is lower than that of the second acoustic matching layer; and wherein the first acoustic matching layer includes a dry gel.

2. The acoustic matching layer of claim 1, wherein the density of the first acoustic matching layer falls within the range of 50 kg/m$^3$ to 400 kg/m$^3$ and the density of the second acoustic matching layer falls within the range of greater than 400 kg/m$^3$ to 800 kg/m$^3$.

3. The acoustic matching layer of claim 1, wherein the acoustic impedance Za of the first acoustic matching layer and the acoustic impedance Zb of the second acoustic matching layer satisfy Za<Zb.

4. The acoustic matching layer of claim 1, wherein the thickness of the first acoustic matching layer is approximately equal to a quarter of the wavelength $\lambda$ of an acoustic wave being propagated through the first acoustic matching layer.

5. The acoustic matching layer of claim 1, wherein the acoustic impedance of the first acoustic matching layer falls within the range of $5\times10^4$ kg/s·m$^2$ to $20\times10^4$ kg/s·m$^2$.

6. The acoustic matching layer of claim 1, wherein the thickness of the second acoustic matching layer is approximately equal to a quarter of the wavelength $\lambda$ of an acoustic wave being propagated through the second acoustic matching layer.

7. The acoustic matching layer of claim 1, wherein the first and second acoustic matching layers both include an inorganic oxide.

8. The acoustic matching layer of claim 1, wherein the first acoustic matching layer includes a powder of the dry gel.

9. The acoustic matching layer of claim 1, wherein a skeleton of the dry gel includes an inorganic oxide.

10. The acoustic matching layer of claim 9, wherein the inorganic oxide is silicon dioxide.

11. The acoustic matching layer of claim 9, wherein the inorganic oxide skeleton is hydrophobized.

12. The acoustic matching layer of claim 1, wherein the first and second acoustic matching layers are directly bonded together.

13. The acoustic matching layer of claim 1, further comprising a structure supporting layer between the first and second acoustic matching layers,
wherein the structure supporting layer has a density of at least 1,000 kg/m$^3$ and a thickness that is less than one eighth of the wavelength $\lambda$ of an acoustic wave being propagated through the structure supporting layer.

14. An ultrasonic transducer comprising: a piezoelectric layer; and the acoustic matching layer of claim 1, which is provided on the piezoelectric layer, wherein the second acoustic matching layer is provided closer to the piezoelectric layer.

15. The ultrasonic transducer of claim 14, wherein the acoustic matching layer is directly bonded onto the piezoelectric layer.

16. An ultrasonic transducer comprising: a piezoelectric layer, and first and second acoustic matching layers provided on the piezoeletric layer, for matching the acoustic impedance of the piezoelectric layer to that of a gas, wherein a second acoustic matching layer is provided closer to the piezoelectric layer,
the first acoustic matching layer having a density of 50 kg/m$^3$ to 500 kg/m$^3$, and
the second acoustic matching layer having a density of 400 kg/m$^3$ to 1,500 kg/m$^3$,
wherein the density of the first acoustic matching layer is lower than that of the second acoustic matching layer;
the transducer further comprising a case, the case including: a top plate that defines a concave portion to embed the piezoelectric layer therein; and a bottom plate that is arranged so as to close up an inner space of the concave portion hermetically,
wherein the piezoelectric layer is adhered onto an inside surface of the top plate of the case, and
wherein the acoustic matching layer is bonded onto the upper surface of the top plate so as to face the piezoelectric layer by way of the top plate.

17. The ultrasonic transducer of claim 16, wherein the case is made of a metal material.

18. The ultrasonic transducer of claim 16, wherein the top plate of the case forms an integral part of the second acoustic matching layer.

19. An ultrasonic flowmeter comprising: a flow rate measuring portion, through which a fluid under measurement flows; a pair of ultrasonic transducers, which is provided for the flow rate measuring portion and which transmits and receives an ultrasonic signal; a time measurement circuit for measuring time that it takes to propagate an ultrasonic wave between the pair of ultrasonic transducers; and a flow rate calculating circuit for calculating the flow rate of the fluid based on a signal supplied from the time measurement circuit,
wherein each of the ultrasonic transducers is the ultrasonic transducer of claim 14.

* * * * *

UNITED STATES PATENT AND TRADEMARK OFFICE
CERTIFICATE OF CORRECTION

PATENT NO. : 6,989,625 B2  Page 1 of 1
APPLICATION NO. : 10/475373
DATED : January 24, 2006
INVENTOR(S) : Masaaki Suzuki et al.

It is certified that error appears in the above-identified patent and that said Letters Patent is hereby corrected as shown below:

On The Title Page:
Title Page, Item (75):

The address for the first and second inventors should read: --Osaka-shi (JP) --;
The address for the third inventor should read: --Moriguchi-shi (JP) -- ;
The address for the fourth inventor should read: --Shijonawate-shi (JP) --;
The address for the sixth inventor should read: -- Neyagawa-shi (JP) --;
The address for the seventh inventor should read: -- Ibaraki-shi (JP) --.

Column 26,

Line 15, "piezoeletric" should read --piezoelectric --.

Signed and Sealed this

Twenty-second Day of August, 2006

JON W. DUDAS
*Director of the United States Patent and Trademark Office*